United States Patent
Burka

(10) Patent No.: US 9,881,281 B2
(45) Date of Patent: Jan. 30, 2018

(54) COLLABORATIVE EVENT PLANNING SYSTEM

(71) Applicant: Jennifer L. Burka, Washington, DC (US)

(72) Inventor: Jennifer L. Burka, Washington, DC (US)

(*) Notice: Subject to any disclaimer, the term of this patent is extended or adjusted under 35 U.S.C. 154(b) by 370 days.

(21) Appl. No.: 13/840,012

(22) Filed: Mar. 15, 2013

(65) Prior Publication Data
US 2014/0278676 A1  Sep. 18, 2014

(51) Int. Cl.
*G06Q 10/00* (2012.01)
*G06Q 10/10* (2012.01)

(52) U.S. Cl.
CPC .................. *G06Q 10/1093* (2013.01)

(58) Field of Classification Search
CPC ............................. G06Q 10/00–50/00
USPC ................................ 705/7.11–7.42
See application file for complete search history.

(56) References Cited

U.S. PATENT DOCUMENTS

| | | | | |
|---|---|---|---|---|
| 8,065,171 B2* | 11/2011 | Nguyen | .................. | G06Q 10/02 705/40 |
| 8,510,145 B2* | 8/2013 | Rowland | .......... | G06Q 10/06311 705/26.1 |
| 2002/0016765 A1* | 2/2002 | Sacks | ...................... | G06Q 20/02 705/39 |
| 2002/0128934 A1* | 9/2002 | Shaer | .................... | G06Q 10/087 705/14.4 |
| 2004/0044644 A1* | 3/2004 | Brady | ................ | G06Q 10/0631 |
| 2005/0033615 A1* | 2/2005 | Nguyen | ................. | G06Q 10/02 705/5 |
| 2006/0271381 A1* | 11/2006 | Pui | ................... | G06Q 10/06311 705/7.13 |
| 2007/0094065 A1* | 4/2007 | Wu | ....................... | G06Q 10/109 705/7.19 |
| 2008/0040188 A1* | 2/2008 | Klausmeier | .......... | G06Q 10/109 705/7.18 |
| 2008/0059256 A1* | 3/2008 | Lynch | .................. | G06Q 10/063 705/7.24 |
| 2008/0201196 A1* | 8/2008 | Rowland | .......... | G06Q 10/06311 705/7.13 |
| 2009/0112727 A1* | 4/2009 | Chi | ...................... | G06Q 10/103 705/301 |

(Continued)

OTHER PUBLICATIONS www.evite.com, "About Evite: Free Online Invitations and Party Ideas".

(Continued)

*Primary Examiner* — Alan S Miller

(57) ABSTRACT

Embodiments of the present invention provide a system and method for collaboratively planning an event via a collaborative event planning application. The collaborative event planning application may be accessed via user terminals connected to a network such as the Internet. Individual aspects such as theme, date, location, attire, travel, and lodging pertinent to the event and group discussion may be edited by a host, designated co-hosts, and invitees. Hosts and invitees may also make decisions regarding the event by voting. The collaborative event planning application may also periodically suggest vendors and provide notifications and recommendations based on the event details and preferences of the users.

11 Claims, 27 Drawing Sheets

(56) References Cited

U.S. PATENT DOCUMENTS

| | | | | |
|---|---|---|---|---|
| 2009/0254615 A1* | 10/2009 | Baliga | ............... | G06Q 10/109 709/204 |
| 2010/0217644 A1* | 8/2010 | Lyle | ............... | G06Q 10/06311 705/7.16 |
| 2011/0258125 A1* | 10/2011 | Iyer | ............... | G06Q 10/10 705/301 |
| 2012/0136689 A1* | 5/2012 | Ickman | ............... | G06Q 10/1095 705/7.19 |
| 2013/0246526 A1* | 9/2013 | Wu | ............... | G06Q 10/109 709/204 |
| 2013/0298043 A1* | 11/2013 | Bailey | ............... | H04L 65/403 715/753 |
| 2014/0052485 A1* | 2/2014 | Shidfar | ............... | G06Q 10/06311 705/7.13 |

OTHER PUBLICATIONS www.punchbowl.com, "Online Invitation and Party Planning Features".
www.pingg.com.
www.paperlesspost.com.
www.facebook.com/help/events.
www.outlook.com.
www.google.com/calendar.
www.synkmonkey.me, Mar. 13, 2013.
www.meetup.com, Mar. 13, 2013.
www.ning.com, "Build and cultivate your own community of fans", Mar. 13, 2013.
www.bigtent.com, 2013.
www.groupspaces.com, Mar. 22, 2013.
www.kohort.com, Mar. 22, 2013.
www.tripit.com, Mar. 22, 2013.
www.surveymonkey.com, Mar. 22, 2013.
www.signupgenius.com.
www.luckypotluck.com.
www.teamsnap.com, "The easiest way to manage your team or group", Mar. 22, 2013.
www.doodle.com, "Doodle simplifies scheduling".

* cited by examiner

100

200

300

400

450

500

600

700

810

820

830

840

850

900

1010

1050

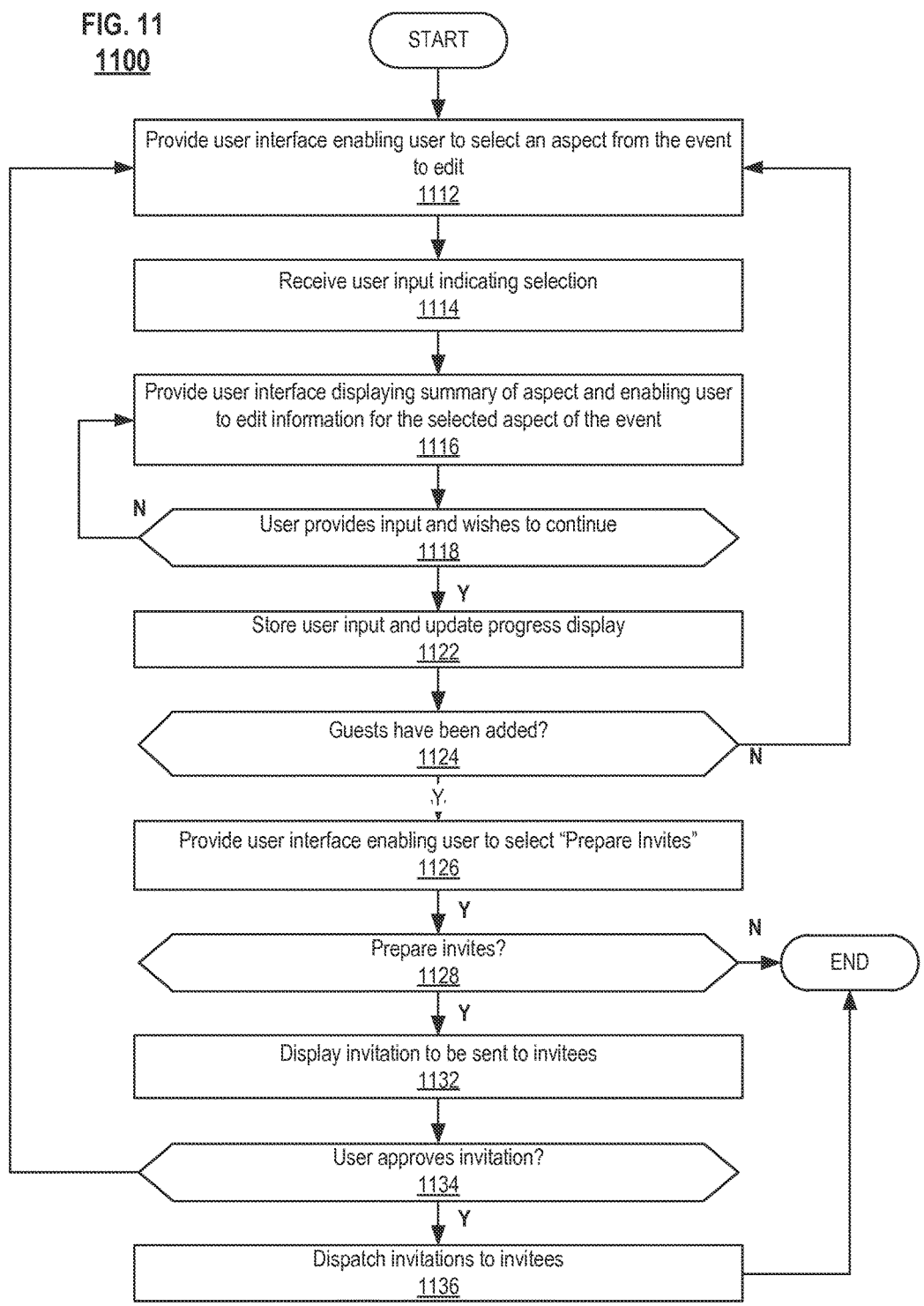

1200

1400

1500

1600

1800

1900

2000

2100

2210

2250

2270

2290

2310

2350

2400

COLLABORATIVE EVENT PLANNING SYSTEM

FIELD OF THE INVENTION

The present invention relates generally to planning and organizing life experiences, and more specifically to Internet-based collaborative planning and organizing by one or more users.

BACKGROUND INFORMATION

Life experiences may range from a bachelorette party to a 10-year high school reunion. They may be as informal as a meal with old friends or as formal as a wedding with 250 guests. These experiences involve some level of planning and collaboration to come to fruition. Each individual's available time for planning and preference for the level of organization will vary, and there is a need for a planning platform that addresses those preferences.

A number of computer software and web-based applications exist that allow users to invite people to and collect RSVPs for events. Websites targeting party planning, group member management, trip planning for individuals, and calendaring and/or finding optimal meeting times for a group exist. Websites targeting a specific aspect of event planning or a specific type of event, such as conducting surveys, collecting sign-ups, organizing potlucks, and organizing sports teams exist. However, there is no system or method of collaboratively planning the details for all types of events, particularly one to connect vendors to consumers at all stages of event planning and to enable those users to share information and make recommendations. Such a system and method will simplify the planning and organizing method by structuring the experience from conception to execution and collecting all information for that experience in one location.

SUMMARY OF THE INVENTION

Embodiments of the present invention provide a system and method for collaboratively planning life experiences via a collaborative event planning application. The collaborative event planning application may help one or more organizing user and other users (collectively, "participants" and "participant users") to post and provide answers to common questions regarding an event such as: "Who's in?", "Where should we go?", "When is everyone available?", "How will we get there?", "Where will we stay?", "What activities are we doing?", and "What should I bring?".

The collaborative event planning application may be accessed via user terminals connected to a network such as the Internet. An organizing user (also referred to as "host" and "planner") may plan an event upon creation of a user account stored in the web application. The organizing user may be guided through a series of introductory planning Web pages that creates a framework for collaboration with other users. This framework may be in the form of additional Web pages containing information associated with the event that is being planned. Once the framework is complete, the host may send invitations to co-hosts and other participants inviting them to help plan and organize the event. In another embodiment, events may be planned without collaboration, but recommendations may still be made for the solo planner.

Each event is made up of event categories, such as date, location, theme, activities, and lodging. Details pertinent to those event categories may be added, suggested and edited by participants. The system may display a graphical user interface (GUI) requesting details corresponding to each category, for example by prompting the user to input text. For example, a user may input text corresponding to a location, an activity, lodging, etc. As further discussed herein, the information may also be collected by other user-interface methods such as drop-down menus. Information input may be integrated with recommendations made by the event planning system. For each detail, polls and discussions may be created by the users to involve other participant users in the decision-making method. The host and sub-groups of participants may have varying editing privileges, which may be defined by the collaborative event planning application, the host, or other participant users. For example, users may be automatically signed up for something, asked to sign up, or told that no sign up is required. The collaborative event planning application may provide templates for creating events. The details associated with different types of events may vary. The collaborative event planning application may also enable users to create a new type of event, where the user will have the ability to include any details associated with that type of event.

The collaborative event planning application may also periodically suggest vendors and provide notifications (also referred to as "reminders"), based on the event details and preferences of the users. For example, the collaborative event planning application may, with the aid of third party payment processing services, allow users to coordinate the organization and accounting of funds for the event. The collaborative event planning application may also provide recommendations for hosts, co-hosts, and participants based on the event planning details of other users who have participated in similar events.

BRIEF DESCRIPTION OF THE DRAWINGS

FIG. 11 is a flowchart illustrating a method of providing a GUI via the planning Web pages of FIGS. 10A-10B.

DETAILED DESCRIPTION

Figure 1:
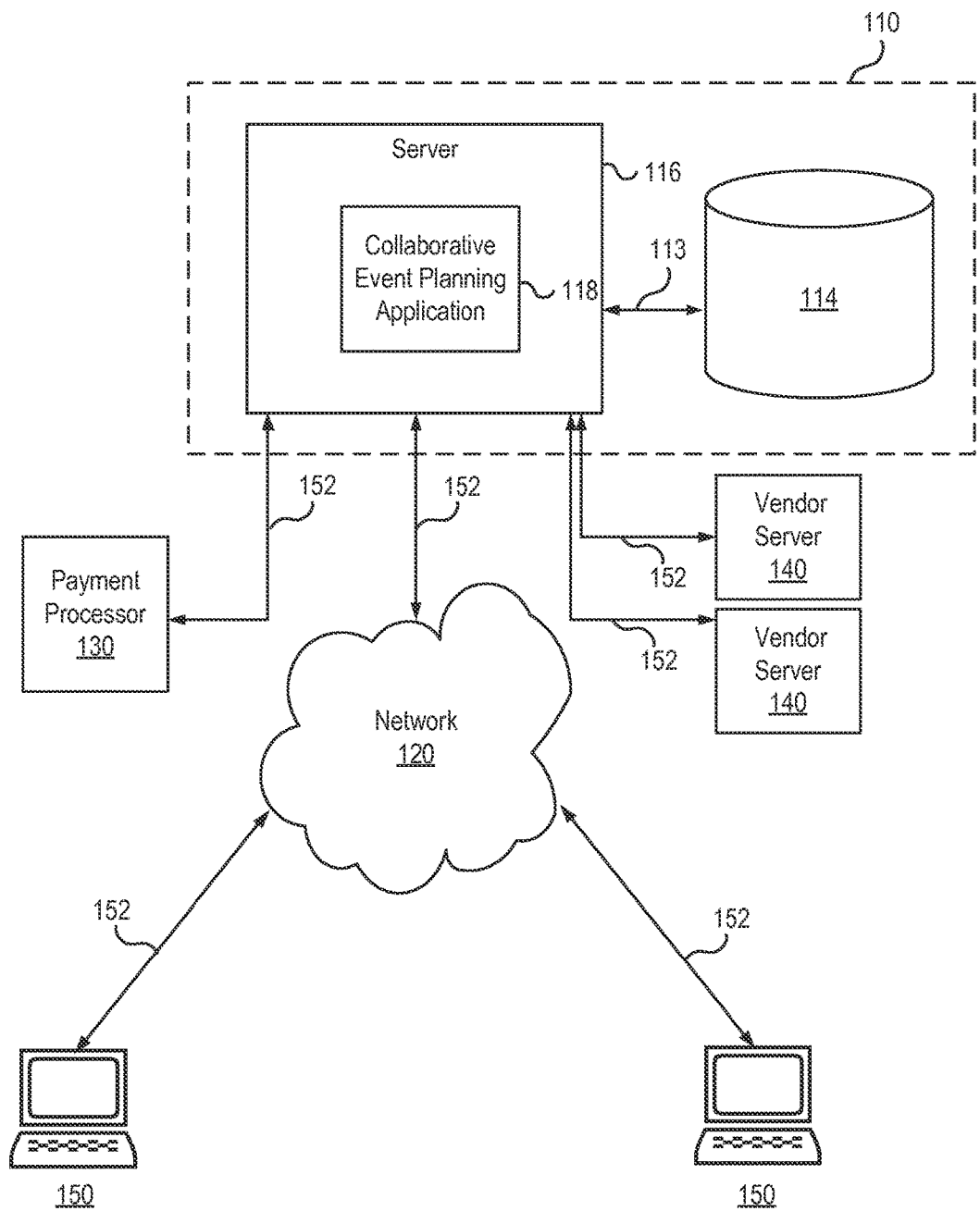
FIG. 1 is a block diagram of an exemplary collaborative event planning network system.

Embodiments of the present invention provide for a system and method to plan an event by enabling users to discuss and/or announce event details, which may include: dates, locations, participants, books, themes, activities, group items, attire, personal items, lodging, custom items, travel, carpools, payments, pictures, contact information, and future events. Embodiments of the invention provide for a fluid process to poll participants in a particular event about various aspects of the event. The event planning process is iterative and repetitive, affording maximum flexibility to users in making and organizing decisions. For example, participants may decide to narrow down a date to two proposals, but other participants may continue to propose additional dates and open polling to more options even after the dates have been narrowed down.

The event details may be edited to varying degrees. For example, users can suggest, vote about, and select dates, locations, and themes for the event. A user can also suggest, vote about, select, add information about, and sign up for activities within an event. A user can also suggest, assign, and sign up for items the group may need. A user can recommend attire for the main event and any activities within the event. A "user suggestion" or a "user recommendation" pertains to a decision about which at least one participant user is polled and for which a consensus may be reached. A recommendation is merely a proposal for an individual to consider and does not typically involve coming to a group consensus. A user can also make suggestions about personal items and/or create a checklist. A user can suggest, vote about, and sign up for custom goods, such as group t-shirts. A user can suggest and share travel plans, including setting up carpools, offering rides, and requesting rides. A user can suggest, vote about, and share lodging information, as well as organize rooms in a lodging situation. A user can share pictures with a group of users involved in a given event ("the group" for convenience). A user can share contact information with the group. A user can add future events, set up recurring events, and sign up to host future events. A user can also share recommendations. A user can also suggest vote for, and/or select books. Each of these features is further detailed herein.

A "User" of the collaborative event planning system refers to all users of the system generally, unless described elsewhere herein. Users may be categorized as follows: (i) a "host" (also referred to as "organizer user" and "planner") is the user who initiates an event and interacts with the web application before invitations are dispatched, (ii) a "co-host" is a user who is invited by the host to help plan the event and has the same editing privileges as the host, (iii) an "invitee" (also referred to as "participant user") is a user who is invited by the host to view details of the events and contribute feedback in specifiable categories but does not have as many editing privileges as the host, and (iv) a "participant" is any user with the ability to view details of the event and contribute feedback, including hosts, co-hosts, and invitees. In an embodiment, event editing privileges are specific to each individual participant instead of an entire category of participants (e.g., hosts, co-hosts, and invitees), enabling even participants who are non-hosts to contribute to the planning process in varying degrees. One or more participants may also be designated by the host as mandatory, because the event cannot happen without that participant(s). For example, the bride is a mandatory participant at a bridal shower. If a conflict arises with a mandatory participant when voting and discussing event details (further described below), the host and co-hosts may be notified. For example, if the mandatory guest cannot attend the event on a particular date, the host and co-hosts may receive a notification and manually remove the date from among" provided to participants. In an embodiment, the event planning system automatically deletes the date on which the mandatory guest cannot participate in a given event. In an embodiment, one or more participants may be designated by the host as priority participants, and dates may be ranked in accordance with a participant's status.

FIG. 1 shows a block diagram of a collaborative event planning network system 100 according to an embodiment of the present invention. The system 100 includes a collaborative event planning server system 110, at least one user terminal 150 communicatively coupled to the server system 110 via a computer network 120, at least one payment processor system 130 communicatively coupled to the collaborative event planning server system 110 via a communication link 152, and at least one vendor server system 140 communicatively coupled to the event planning server system 110 via another communication link 152. The event planning server system 110 includes a server computer system 116 for executing collaborative event planning application 118, and event planning database 114 for storing template event planning information and events created by users that is communicatively coupled to the server computer system 116 via line 113. The server computer system 116 is communicatively coupled to the network 120 via communication link 152. In alternative embodiments, the payment processor system 130 and the vendor server 140 may each be communicatively coupled to the event planning server system 110 via the network 120. In embodiments, the network 120 may be an internet protocol (IP) network or a local area network (LAN); the communication links 152 may be T1 lines.

Figure 2:
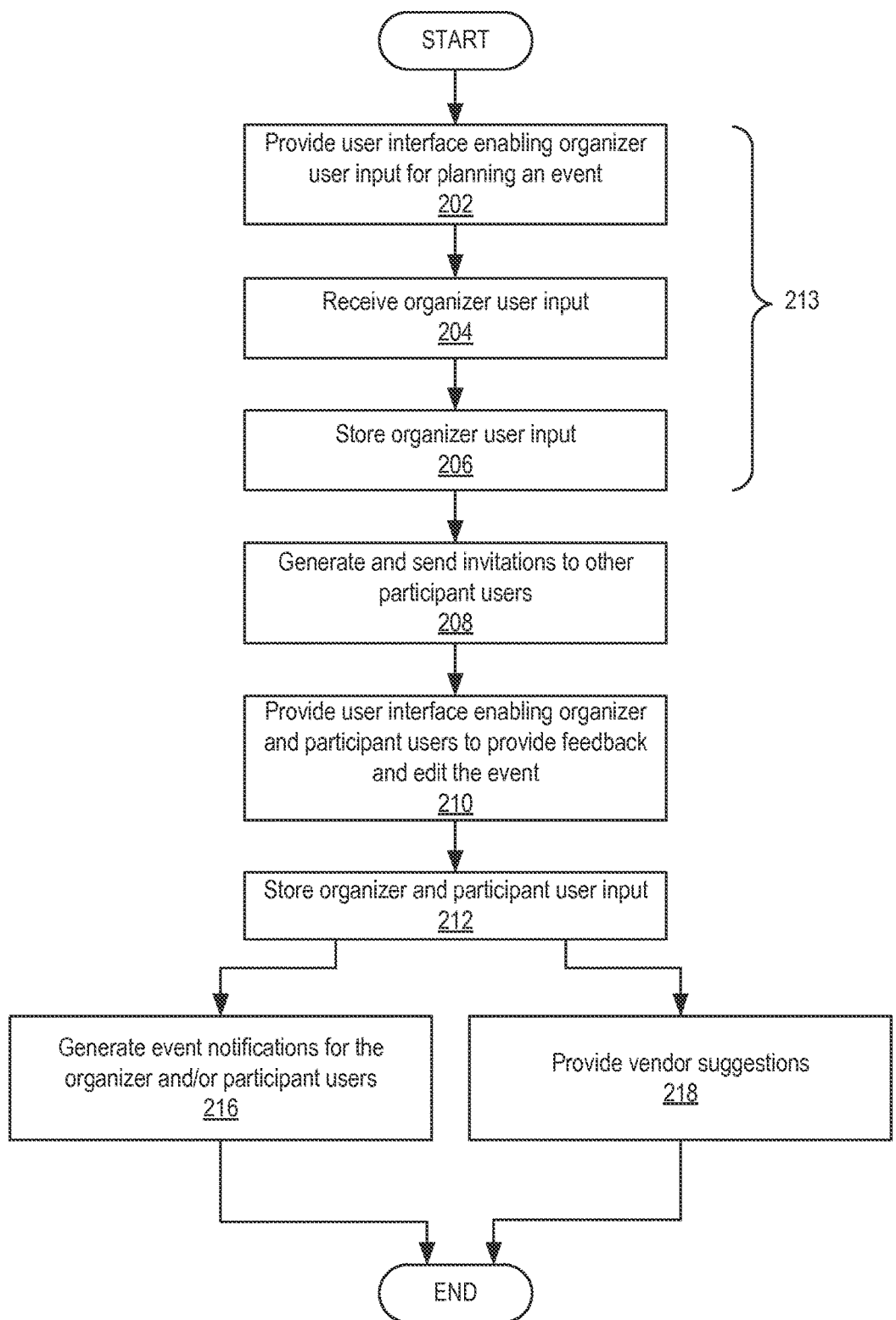
FIG. 2 is a flowchart illustrating a collaborative event planning method that may be executed by the system of FIG. 1.

FIG. 2 is a flowchart illustrating an event planning method 200 executed using an event planning system (such as the event planning system 100 of FIG. 1). The method 200 comprises a planning process 213 in which event details are entered and saved by a host, followed by steps in which collaboration may further flesh out the details of the event. As denoted by bracket 213, steps 202 to 206 may be characterized as the planning process in which certain details are gathered and saved. In an embodiment, the host may be taken through an initial planning phase (such as the exemplary planning Web pages in FIGS. 8A-8E) in which known details may be added to structure the framework of the event. Following this initial planning phase, the host may be taken to a main planning page where the host may continue to add details according to steps 202 to 206. The host may generate and send invitations to other participants and co-hosts in step 208 at any time to enable further editing by a group of users in the rest of the method. In an embodiment, a host sets up an event through the initial planning phase, after which she or he may send invitations to select participants to contribute to the rest of the planning method. During the rest of the planning method, the details gathered may be voted upon or otherwise discussed. Additional details may be added during the rest of the planning method as well.

The method 200 begins with step 202 in which the event planning server system provides a GUI enabling a host to plan an event. For example, the GUI is provided by generating a series of Web pages that are accessed by user terminals and viewable through Web browser applications. The GUI may prompt the host to search for or select an event from event templates, or enable the user to create his or her own event. The method 200 then proceeds to step 204 in which the event planning server system receives user input from the host defining the desired event, for example the selection of an event from a listing of event templates or inputting a new type of activity. In step 206, a server computer system executing an associated event planning application stores the information provided by the user in step 204 by creating records associated with the information. Steps 202 to 206 may be repeated to store different aspects of an event. For example, the method as defined by the collaborative event planning system may guide the host through a series of basic questions such as who is invited (this may include co-hosts and participants), when the event is happening, where the event is happening, and further planning details such as lodging, carpools, and others further discussed below. The host may also skip any question and return to it in a later planning step as further discussed below. After the host has entered details in steps 204 to 206, the host may indicate that invitations are ready to be sent.

The method 200 then proceeds to step 208 in which the server computer system generates and sends invitations to co-hosts and/or participants in accordance with the procedures described in further detail below. The host may specify which invitees receive an invitation. In one embodiment, the event planning system may generate a Web page including the stored event details and send an Email message to associated invitees with a link to the Web page. In another embodiment, the event planning system may generate a link such as a hash code that would enable access to the event page. In an embodiment, a full membership account is created when the host provides invitee details. In an alternative embodiment, as soon as a host provides the invitee details of a user who has never previously accessed the event planning system, a "limited membership" account is created. A "limited membership" account enables the user to view event details, but he or she must create an account to fully participate in the event planning. Creation of an account in such a situation is further detailed below.

In step 210, the event planning server system receives further user input, which may be from the host, co-hosts, and other participants. Editing of certain aspects of the event information may be restricted to only the host, co-hosts, and/or a sub-group of invitees. In an embodiment, hosts and co-hosts may access a "Plan It" page, while participants may access and edit only information found on a group informational page and "My Info" page further discussed below. In addition, only the user may view his or her own payment information page. The server computer system links to a payment processor (such as the payment processor system 130 of FIG. 1) to make and verify a credit card transaction or other monetary transaction in accordance with well-known methods. Different options for payment may also be provided.

In step 212, a server computer system executing an associated event planning application stores the information provided by the user(s) in step 210 by creating records associated with the information. Steps 210 and 212 may be repeated until sufficient information, as defined by the collaborative event planning system (for convenience, "event planning system") or host, has been entered and stored. For example, an aspect of the event may use polling to reach a consensus, and a host may define completion of that aspect when a consensus has been reached.

In step 216, which may occur periodically throughout the method based on milestones such as goals set by the host and/or co-hosts or automatically detected by the server computer system based on a timeline (or calendar) of the event, the server computer system generates event notifications and reminders to the users. In one embodiment, event notifications are sent weekly by default and the frequency may be adjusted by the host and/or co-hosts. Event notifications may be sent via a third party application such as Email or FACEBOOK, be displayed on a user's "Events" page, be displayed on a "Notifications" section on a user's "Home" page, or be sent via text message. Event notifications may be categorized and predefined to be sent to a sub-group of participants. In step 218, which may occur periodically throughout the method based on user input, the server computer system may provide targeted vendor suggestions and recommendations from other users.

Figure 3:
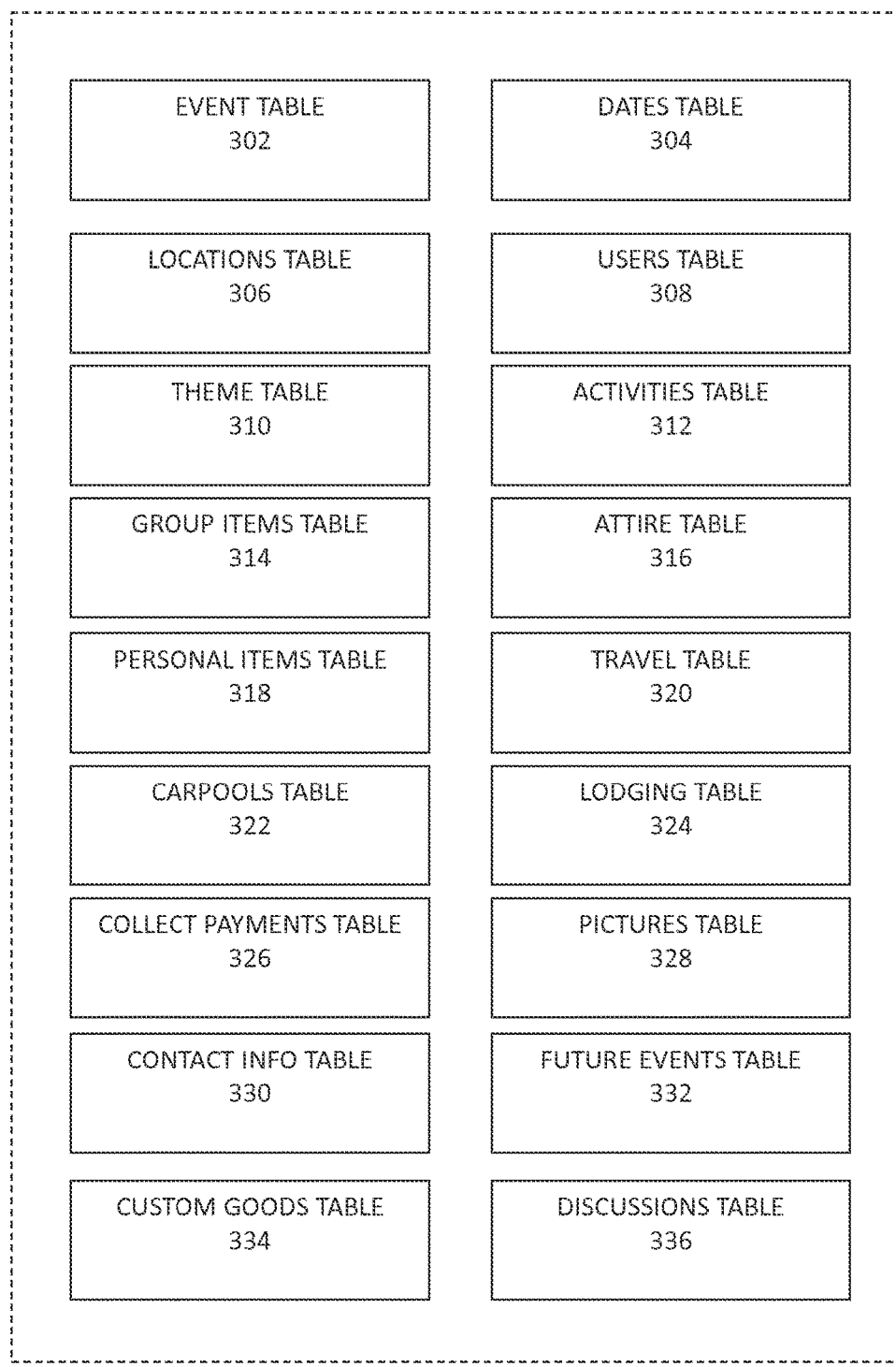
FIG. 3 shows an exemplary event planning informational database that is part of a collaborative event planning network system.

FIG. 3 shows an exemplary event planning informational database 300 that is part of a collaborative event planning network system according to an embodiment of the present invention. In an embodiment, tables are organized by details pertaining to an event. For example, the lodging table 324 contains data about lodging, including templates and specific details corresponding to the lodging aspect of users' events.

Figure 4A:
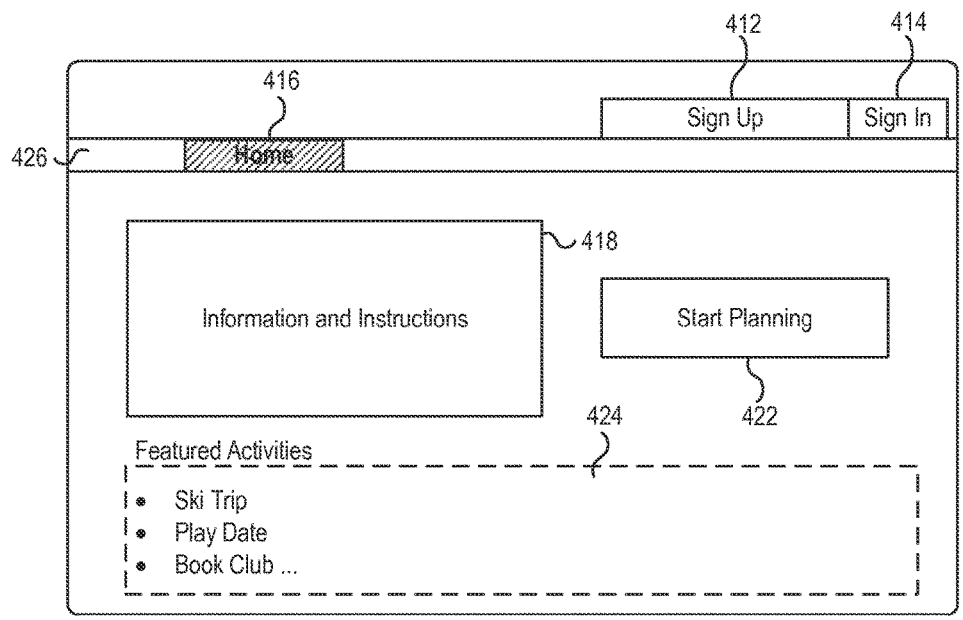
FIG. 4A shows an exemplary home page for providing a graphical user interface (GUI) in which a user has not signed into an account.
Figure 4B:
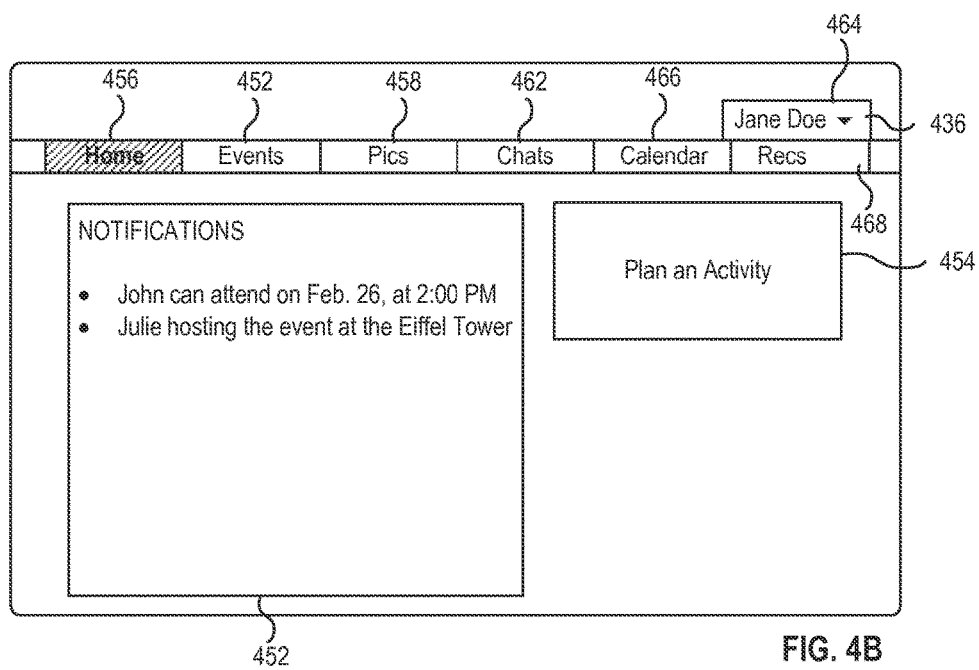
FIG. 4B shows an exemplary home page for providing a GUI in which a user has signed into an account.

FIGS. 4A and 4B are block diagrams of exemplary home pages 400 and 450 for providing a GUI by the event planning server system. The user may be directed to page 450 upon login. The home page 400 may include Buttons 412, 414, 416, and 422 enabling a user to activate functions as further explained below. Functions corresponding to the Buttons may be activated by a mouse-click, tap on a touch screen, or other indication of selection. The Web page may also have an information and instruction block 418 for displaying information and a featured activities block 424 for displaying a sub-set of event templates. Buttons that appear consistently across more than one Web page generated by the collaborative event planning system may appear on a menu bar 426 in the GUI to help users navigate to various Web pages. The Web page associated with a menu item may be shaded in or otherwise marked to indicate to the user that he or she is currently viewing that page. For example, the "Home" Button 416 may be shaded in in FIG. 4A. The menu bar 426 may change upon signing in.

Button 412 enables a user to create an account. The user may be prompted by the event planning server system to provide information such as an Email address and password to create an account. The GUI for providing registration information may appear on the current Web page or be available at another Web page to which the user is directed when button 412 is clicked. Additional user information may be gathered at a later time as well.

Button 414 enables a user to sign into an existing account by activating the corresponding function. When a user signs into an account, the server computer will retrieve the events in which the user is a host or participant, and enable him or her to edit details associated with those events, limited by user privileges as further detailed below. The user may be prompted by the event planning server system to provide information associated with an account, such as an Email address and password. If there is a match between the user's provided information and the identifying credentials for an account, his or her home page is displayed as discussed further below. If there is no match, the user may be prompted to register.

Button 416 enables a user to return to the main home page or personal home page, depending on whether the user is logged in. Button 416 may appear on every Web page displayed by the collaborative event planning system, for example in the menu bar 426. If a user is not signed into an account, clicking button 416 will activate a function to display the main home page 400. Once a user is signed into an account, clicking button 416 will activate a function to display a personal home page (such as the personal home page 450 of FIG. 4B).

Button 422 enables a user to begin planning an event. However, if a user has not yet signed in, he or she will be prompted to sign in and/or create an account first.

The featured activities block 424 is an area of the main planning Web page 400 for displaying various event-planning templates. For example, it may display templates recently added to an event planning informational database and available for use by users. It may also display templates that are particularly pertinent to the present time of year such as a holiday theme party. In an embodiment, the featured activities block 424 may display a predefined number or subset of activities. In another embodiment, the featured activities block 424 may display a predefined number or subset of activities with the rest being available for viewing via a scroll bar.

The information and instruction block 418 may display information such as announcements for all users of the Web page. In an embodiment, an additional text block may be dynamically updated, as a user peruses the featured activities block 424. For example, a user may hover his or her cursor (or tap in the case of a touch screen user terminal) over a particular featured activity, and a corresponding description of that activity may be displayed in the information and instruction block 418.

The personal home page 450 may include Buttons 452, 454, 456, 458, 462, 464, 466, and 468 to activate functions as further explained below. Buttons (e.g., 452, 456, 458, 462, 466, 468, 464 and 436) that appear consistently across all Web pages generated by the collaborative event planning system may appear on a menu bar 426 in the GUI to help users navigate to various Web pages as described above.

Button 456 enables a user to return to the personal home page 450 whenever it is selected by refreshing and displaying the personal home page 450 as it appears when a user initially logs in or navigates to the page.

If a user is signed in, Button 464 may be displayed. The Button 464 enables a user to edit and/or view his or her user profile as further detailed below. An arrow 436 next to the Button 464 may enable a user to select other functions associated with a user account, such as viewing his or her contacts and signing out.

If a user is signed in, Buttons 452, 458, 462, 466, and 468 may be displayed on the Menu Bar 426. These Buttons allow a user to enable a function for viewing various aspects of existing events as further discussed below. Selecting Button 452 will display a Web page with a list of all existing events associated with that user account. In a similar manner, selecting Button 458 will display a Web page with a list of all pictures, which may be in the form of photo albums, associated with all existing discussions. In a similar manner, selecting Button 462 will display a Web page with a list of all chats associated with all existing events. Button 466 displays a calendar with events that may be selected. In embodiments, the calendar can be synced to calendars of third-party platforms, and the calendar can also be used to generate notifications (further described herein). Button 468 displays recommendations. The Web pages that are associated with enabling the functions of Buttons 452, 458, 462, 466, and 468 may enable further editing by the user as discussed below.

Each of the Buttons 452, 458, 462, 464, 468 and 436 display a single aspect of multiple events, which is responsive to an event planner's need to manage common aspects of multiple events. For example, "Chats" may be the most frequently updated aspect of events. The Chats button 462 enables a user to quickly view and edit discussions for each of her events, instead of navigating to each event. This may advantageously reduce the number of steps taken to reach a desired page or step in the planning method.

Figure 5:
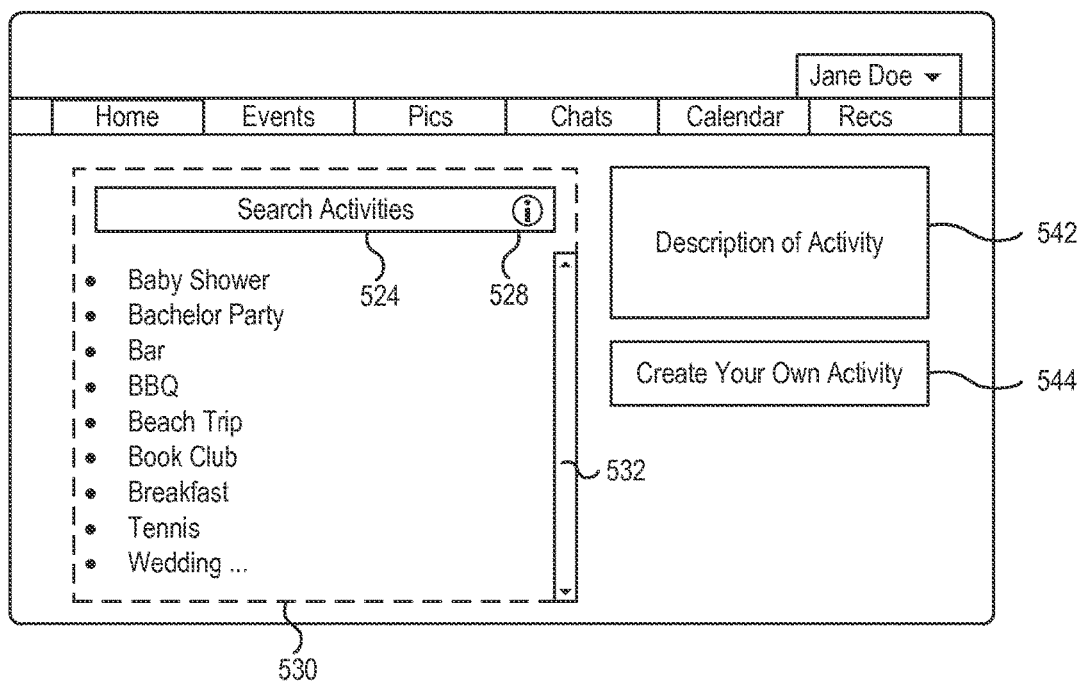
FIG. 5 shows an exemplary personal planning Web page for providing a GUI.

FIG. 5 is a block diagram of an exemplary personal planning Web page 500 for providing a GUI. If the user selects the "Start Planning" Button 422 on main home page 400 prior to logging in or creating an account, the user may be directed to page 500 after logging in or signing up. The user may also be directed to page 500 from personal home page 450 if the user selects the "Plan an Activity" Button 454. The personal planning Web page 500 may include Buttons 524, 528 and 544 to activate functions as further explained below. The Web page may also have an event template selection block 530 for displaying information and an activity description area 542 for displaying information corresponding to the event templates.

The event template selection block 530 is an area of the personal planning Web page 500 where a user may search for and display various event-planning templates. These templates may be stored in an informational database and updated to provide better suggestions and new events. The user may enter a search term into field 524 to activate a function for searching for a template in the event planning informational database. The search result may be based on a synonym or other users' searches, and need not be an exact textual match. The event template selection block 530 may also display templates recently added to an event planning informational database and available for use by users. It may also display templates that are relevant to user data, location data, or a particular time of year such as a holiday. In an embodiment, the event template block 530 may display a predefined number or subset of activities with the rest being available for viewing via a vertical scroll bar 532 and/or a horizontal scroll bar (not shown). The event templates may be displayed as a graphic, icon, and/or animation with or without accompanying text labels. The templates may be displayed in a grid format, for example a 4-by-4 grid that may adaptively be increased or decreased in size based on the size of the Web browser at the user terminal. The user may also select an informational icon 528, for example by clicking on it or hovering over it to enable a function for displaying instructions on how to navigate the Web page. The instruction may be displayed without leaving the Web page, for example, via a pop-up window.

The activity description block 542 may display information corresponding to event templates. It may also be dynamically updated, as a user peruses the event template selection block 530. For example, a user may hover his or her cursor over a particular event template, and a corresponding description of that activity may be displayed in the activity description block 542 while the cursor hovers over the activity or for a predetermined period of time.

Figure 6:
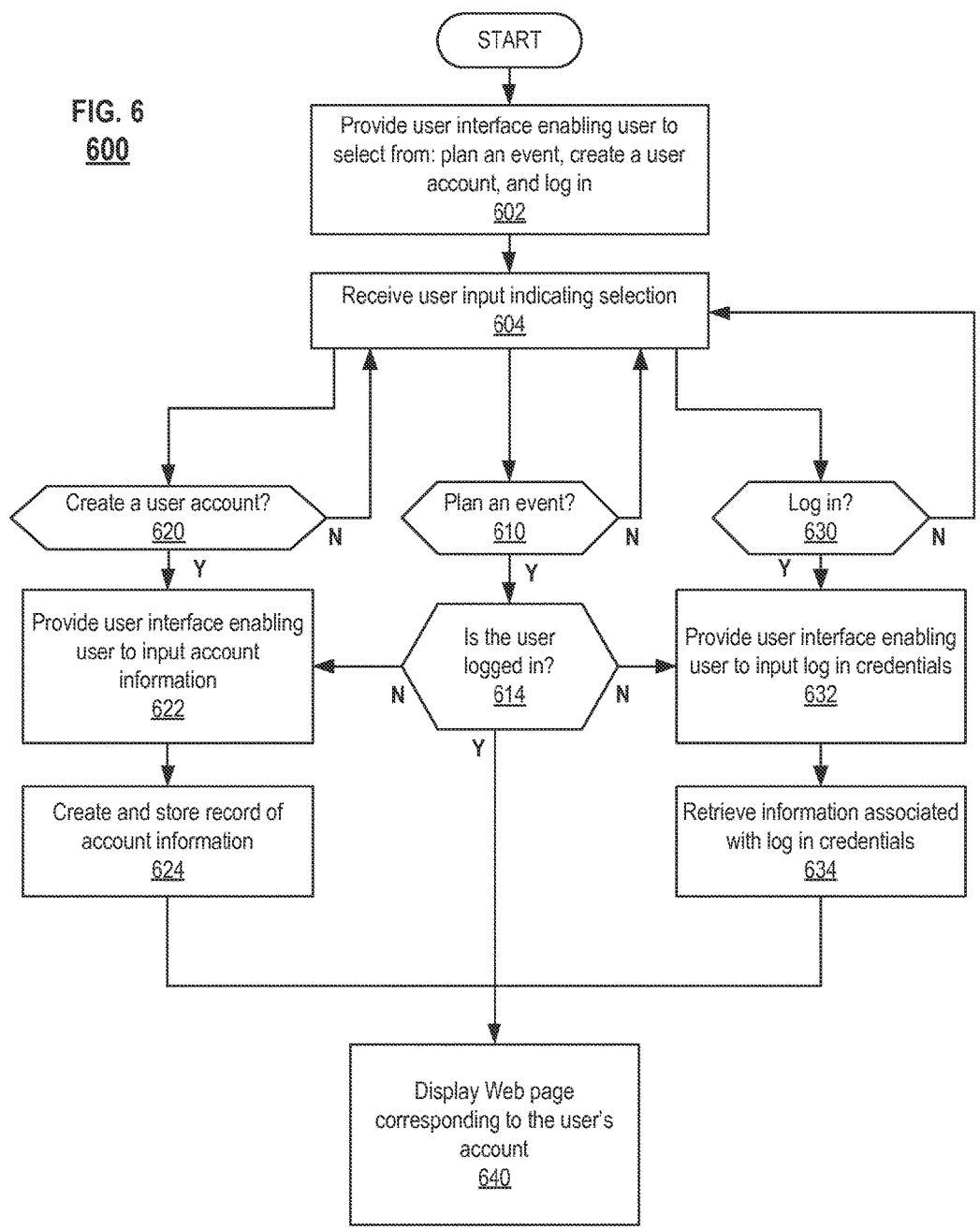
FIG. 6 is a flowchart illustrating a method of providing a GUI via the main planning Web page of FIG. 4.

FIG. 6 is a flowchart illustrating a method 600 of providing a GUI via the main planning Web page of FIG. 4. The method 600 begins at step 602 when a GUI is provided enabling a user to activate functions associated with planning an event, creating a user account, and logging into a user account. After the method receives user input indicating a selection of the options in step 604, the method 600 queries whether the user wishes to create a user account in step 620. If the user wishes to create a user account, in step 622, the method 600 provides a GUI enabling the user to input account information. In step 624, the collaborative event planning system reads in the user input, which may include error checking for syntax mistakes or whether the account already exists, and, if the user input is error-free, creates and stores a record of the account information. The collaborative event planning system may then display a Web page corresponding to the newly-created user account in step 640. If there is an error with the user input of step 624, the collaborative event planning system may display an error message including suggestions or instructions.

The method 600 queries whether the user wishes to log into a user account in step 630. If the user wishes to log in, in step 632, the collaborative event planning system provides a GUI enabling the user to input account information. In step 634, the collaborative event planning system reads in the user input, which may include error checking for syntax mistakes, and, if the user input is error-free, retrieves information associated with the log-in credentials. The method 600 then displays a Web page corresponding to the user account in step 640. If there is an error with the user input of step 632, the collaborative event planning system may display an error message including suggestions or instructions.

The method 600 queries whether the user wishes to plan an event in step 610. If the user wishes to plan an event, the method 600 queries whether the user is logged in in step 614. If the user is logged in, the user may be directed to planning page (such as the page 500) in step 640. If the user is not logged in, the user may be redirected to the sign up page (box 622) or log in page (box 632). Upon login or creation of an account if the user had originally selected plan an event (box 610), the user may be directed to planning page 500 instead of home page 450. In an alternative embodiment, the user may plan the event before being prompted to create a user account or logging in.

Figure 7:
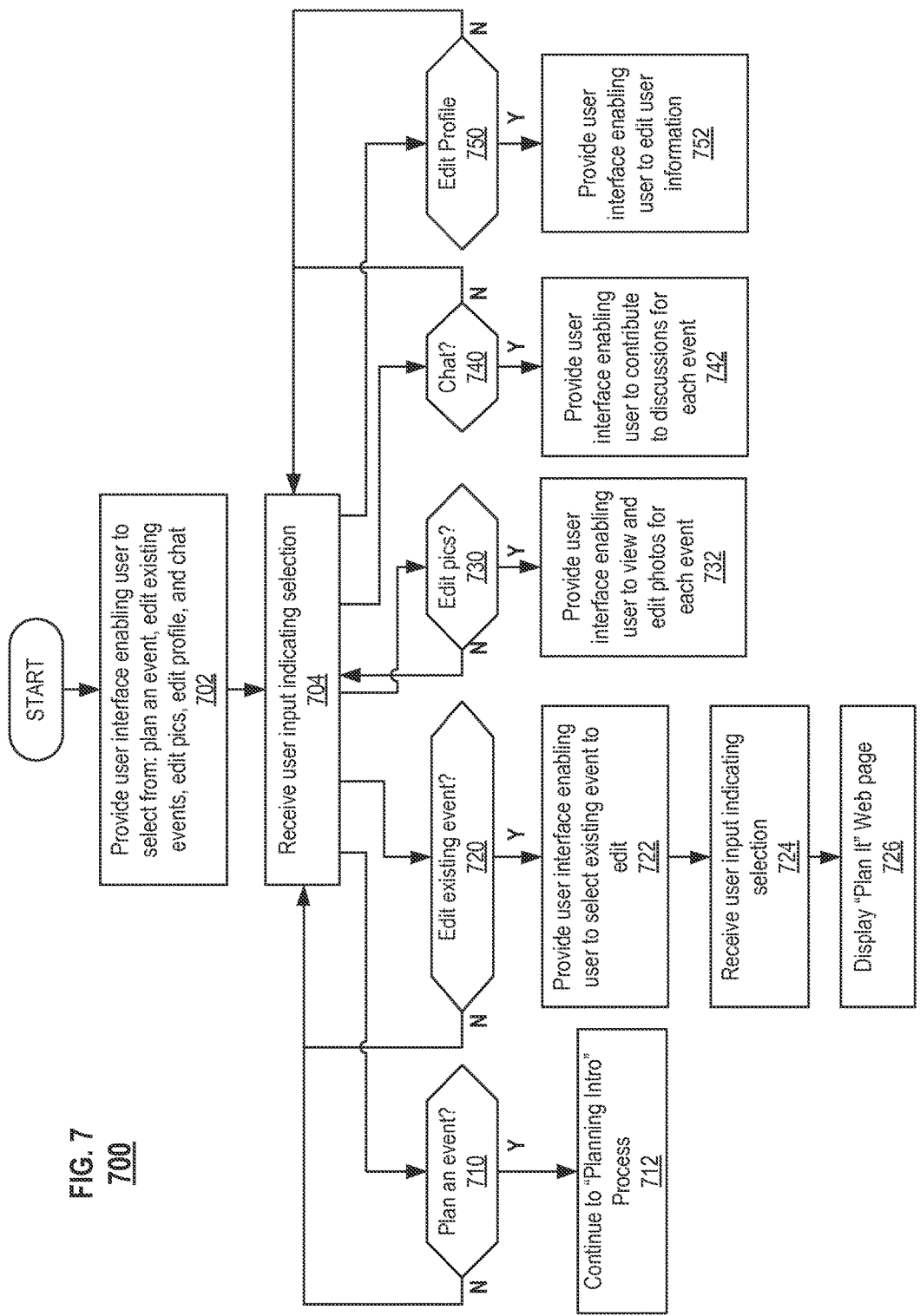
FIG. 7 is a flowchart illustrating a method of providing a GUI via the home page of FIGS. 4A and 4B.

FIG. 7 is a flowchart illustrating a method 700 of providing a GUI via the home page of FIG. 4B. The method 700 begins at step 702 when a GUI is provided enabling a user to activate functions associated with planning an event, editing existing events, editing pics, editing a user profile, chatting, recommendations, contacts, and calendar. After the method receives user input indicating a selection of the options in step 704, the method 700 queries whether the user wishes to plan an event in step 710. If the user wishes to plan an event, the method 700 continues to a planning page, such as the exemplary personal planning Web page 500. In embodiments, if the user selects an event template, the user may continue to an introductory pages method in step 712, such as the method 900 of FIG. 9.

The method 700 queries whether the user wishes to edit an existing event in step 720. If the user wishes to edit an existing event, in step 722, the collaborative event planning system provides a GUI enabling the user to select an existing event, which was previously created by the user or another user who has indicated that the user may edit the event. In step 724, the method reads in the user input indicating the event he or she wishes to view and/or edit, then displays a Web page for editing the event, such as the Web page 1010 of FIG. 10A.

The method 700 queries whether the user wishes to edit pics in step 730. If the user wishes to edit pics, in step 732, the collaborative event planning system provides a GUI enabling the user to select a photo album associated with an existing event. Each photo album is a collection of pics uploaded by participant users who have permission from the planner to upload or edit pics for that event. In step 732, every participating user may edit his or her own personal album for the event. "Pics" may refer to pictures, photographs, videos, and other media related to an event, including those recorded at the event.

The method 700 queries whether the user wishes to chat in step 740. If the user wishes to chat, in step 742, the collaborative event planning system provides a GUI enabling the user to select a discussion thread associated with an existing event, which was previously created by the user or another user who has indicated that the user may view and participate in the discussion.

The method 700 queries whether the user wishes to edit a user profile in step 750. If the user wishes edit his or her user profile, in step 745, the collaborative event planning system provides a GUI corresponding to a user's profile Web page, enabling the user to edit his or her profile and all associated settings. For example, the user may update his or her contact information and birthday. The user may also edit his or her notifications settings, recommendations settings, and other personal settings on the user profile Web page. Although not shown, the method 700 can also receive input at step 704 corresponding to making recommendations and accessing and/or editing a calendar associated with the account as further described herein.

FIGS. 8A-8E are block diagrams of exemplary introductory planning Web pages for providing a GUI. Introductive planning questions may be asked through a series of GUIs such as the introductory planning pages 810-850. The introductory planning pages 810 to 850 may be presented in any order and may include additional pages. The questions asked may change with the type of event, and therefore, change the order and/or number of introductory planning pages displayed. The following is an example of the order in which the Web pages may be displayed to the user. The information input into these Web pages may serve merely as a proposal, and be edited by the planner or other participants as further described below.

Figure 8A:
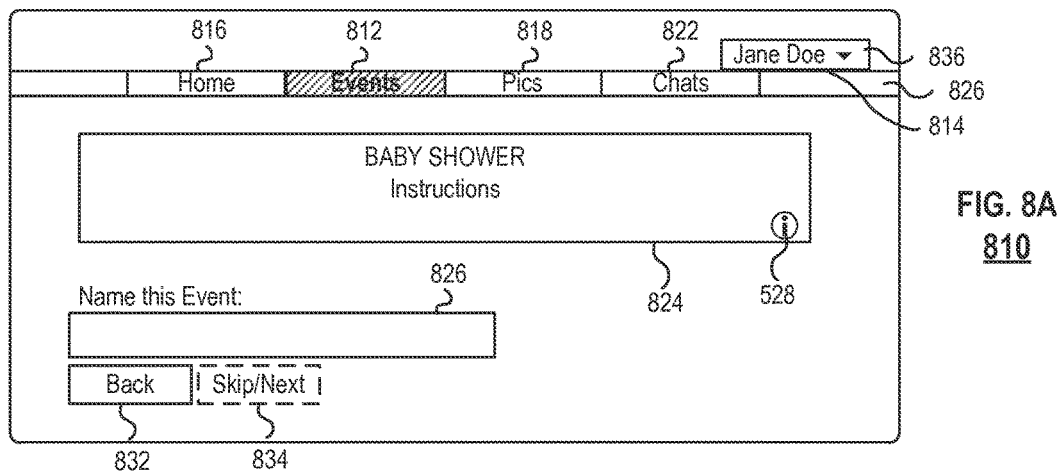
FIGS. 8A-8E show exemplary introductory planning Web pages for providing a GUI.

The naming introductory Web page 810 of FIG. 8A enables a user to name the event being planned. The naming introductory Web page 810 may include a text block 824 displaying the type of event, which may be a title provided by the user in the case that the user creating his or her own type of event, and instructions accompanying the event. The naming introductory Web page 810 may include a field 826 for the user to input a name for the event. The naming introductory Web page 810 may include a menu bar 826 with Buttons 812, 814, 816, 818, 822, 832, and 834. Although not shown, the menu bar 826 may contain additional buttons, such as ones corresponding to calendar and recommendations. These Buttons have the same functions as those described above for FIGS. 4 and 5, unless otherwise described herein. Button 832 enables the user to activate a function that displays an immediately previous GUI that the user had accessed. Button 834 may enable the user to activate a function that displays the immediately subsequent GUI without having completed the fields in the current Web page when the associated text displayed is "Skip". The event may be saved upon selecting button 834. If the fields are incomplete and the user skips the naming introductory Web page 810, the activity type may be saved as the event name and may be edited at a later time. When the fields in the current Web page have been completed by the user, the Button 834 may also change to "Next," enabling the user to activate a function that displays the immediately subsequent GUI.

Figure 8B:
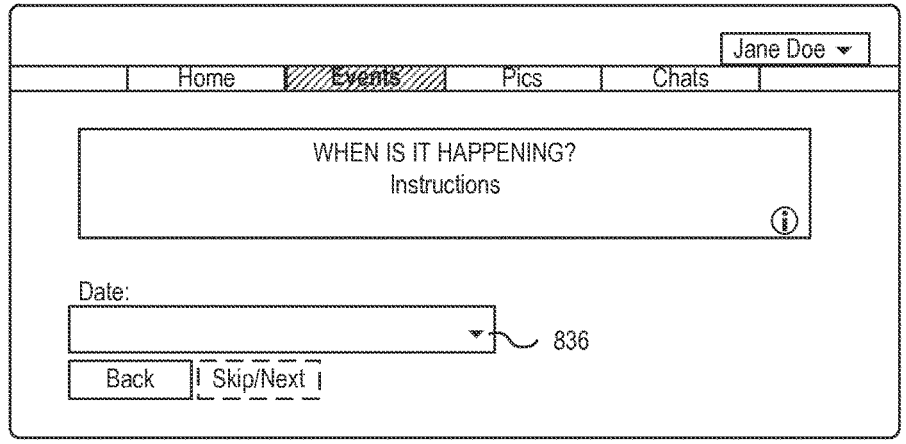

The timing introductory Web page 820 of FIG. 8B enables a user to provide information about when an event is taking place. The timing introductory page 820 may include a field 836 for the user to input a time for the event. In an embodiment, a drop-down menu may be activated by icon 836, which displays a calendar from which the user may select a date and time for an event. The user may input a range of dates for the event or skip this step. In an embodiment, a user may create a recurring event by selecting a "Future Events" checkbox on the details page. Future events may then be added to the planning summary area of the "Plan It" page (for example, the planning summary block 1030 of FIG. 10A), and the user may indicate the frequency of the event or events taking place in the future that is related to the current event.

Figure 8C:
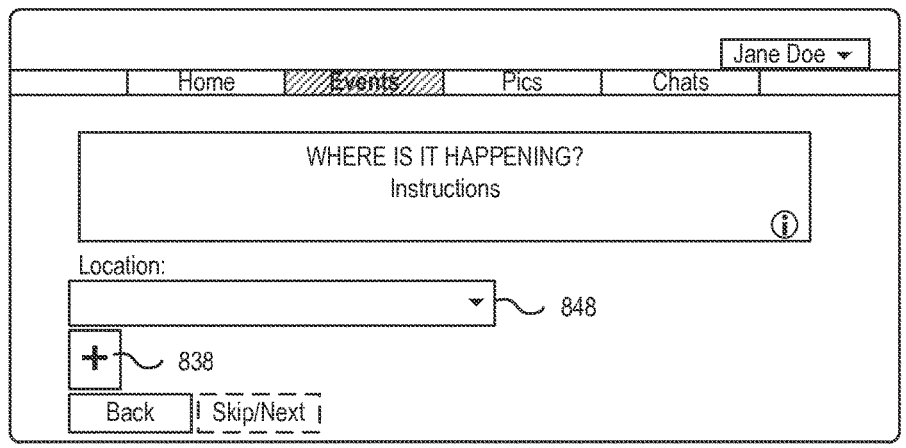

The location introductory Web page 830 of FIG. 8C enables a user to provide information about where an event is taking place. The location introductory page 830 may include a field 848 for entering a place where the event is taking place. The field may provide suggestions for locations while the user is inputting a location, for example, through auto-completion. The user may also add a location by selecting Button 838 to accommodate events that may take place in a number of different locations.

Figure 8D:
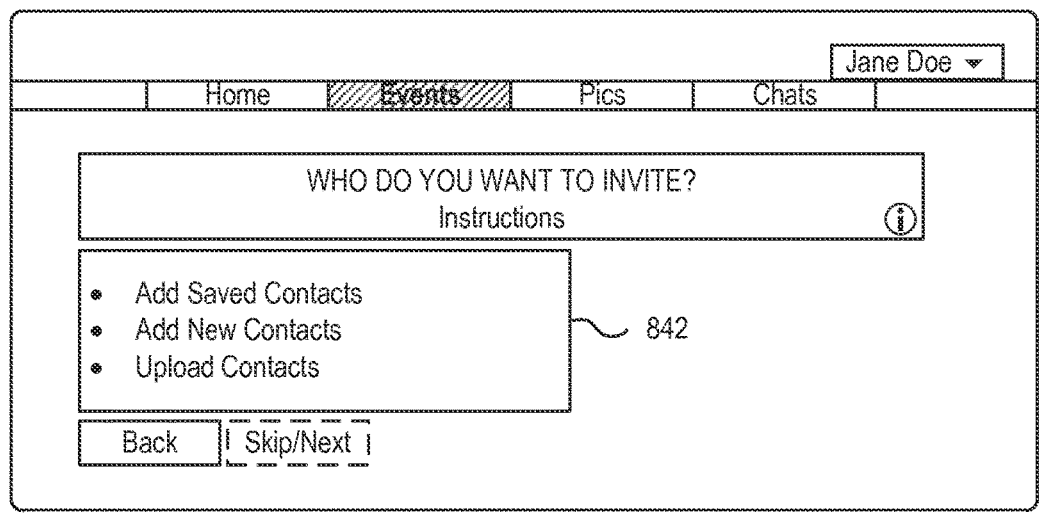
Figure 8E:
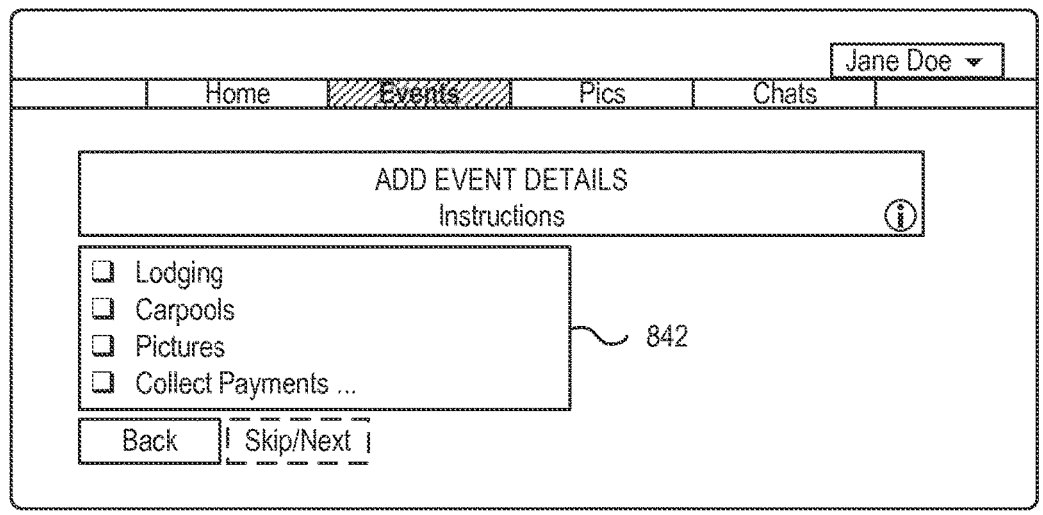

The guest introductory Web page 840 of FIG. 8D enables a user to provide information about the guests of an event. The guest introductory page 840 may include a field 842 for the user to add guests to the event guest list. In an embodiment, the user may have three options for entering contacts: adding contacts saved to his or her user profile, adding new contacts, and uploading or importing contacts from a third-party service. The user may have contacts already saved to his or her user profile, for example in an address book. The user may also input email addresses by "adding new contacts," and those contacts will also be saved to his or her profile for future use. The user may also upload contacts from a third-party service, such as an Email provider. The user may select a method for inputting contacts by clicking a button associated with each method, which activates a function corresponding to each method of inputting contacts. A user may also enter Email addresses by any combination of the three methods described.

The event details Web page 850 enables a user to provide information about the details of an event. These details may be unique to the particular type of event and are retrievable from the event planning informational database. These details may include information relating to any of the categories: theme, activities, group items, attire, etc. Selection of an event category enables the host, co-hosts, and invitees to edit that category of the event. For example, the host may select "Theme" and "Group Items," and "Lodging" on this Web page, to enable editing on the "Plan It" page (for example, these aspects appear under "Planning Summary" on the planning page 1010 of FIG. 10A). Selection of a Theme detail may also provide recommendations for details in other categories, such as group items associated with that Theme detail in the event planning informational database. On the other hand, event categories that are not selected will not be editable. At a later stage, hosts, co-hosts, and/or invitees may add or hide editable categories as further discussed below. This feature helps users to focus their planning on pertinent aspects of the event. Categories may be added in later planning stages as well.

In embodiments, recommendations are provided in the form of "quick adds" for each detail as follows. The quick adds can be associated with the type of event, the event date, the event location, the user information, the theme, any activity types, recommendations from saved contacts, and attendance by saved contacts. The recommendations can also be based upon one or more vendor list stored in the event planning system. The vendor list can be periodically updated by the platform, and reflect popular user recommendations. In an embodiment for a book club event, the quick adds can be specific books. The event planning system can provide an additional link to a third party vendor via the GUI. Additional quick adds can be hidden from view and expanded via an activation of a "see more" link. Books can be suggested depending on the type of event, the user information, and recommendations from saved contacts.

In an embodiment for themes, the quick adds can be associated with the type of event, the event date, the user information, recommendations from saved contacts, and attendance by saved contacts.

In an embodiment for activities, the quick adds can be activity types associated with the type of event, the event theme, the event date, the event location, user information, recommendations from saved contacts, and participation by saved contacts. For each activity type, the event planning system can make suggestions. The suggestions can be associated with the activity type, the type of event, the event location, the event date, user information, whether the activity is on a event planning system vendor list, recommendations from saved contacts, and participation in the activity by saved contacts.

In an embodiment for group items, the quick adds will be types of items associated with the type of event, the event theme, the event date, the event location, user information, any activity types, recommendations from saved contacts, and items added by saved contacts. Suggested items can be associated with the item type, the type of event, the event theme, the event date, the event location, any activity types, user information, whether the item is on a event planning system vendor list, recommendations from saved contacts, and purchases/clicks by saved contacts. Suggested items may include, for example, products or recipes.

In an embodiment for attire, the event planning system enables the user to recommend attire for the main event and any activities added to the event. For example, a drop-down that lists the recommended attire for the event or the activity can be provided via a GUI. Suggested attire for the event can be associated with the type of event, the event theme, the event date, the event location, user information recommendations from saved contacts, and attire added by saved contacts. Suggested attire for an activity can be associated with the type of activity, the event/activity date, and the event/activity location, user information, recommendations from saved contacts, and attire added by saved contacts.

In an embodiment for personal items, the event planning system enables the user to recommend personal items for the main event and any activities added to the event. The quick adds for the main event can be types of personal items associated with the type of event, the event theme, the event date, the event location, user information, recommendations form saved contacts, and personal items added by saved contacts. The quick adds for each activity can be types of personal items associated with the type of activity, the event/activity date, the event/activity location, user information, recommendations from saved contacts, and personal items added by saved contacts. The suggested items can be associated with the item type, the type of event, the event theme, the event date, the event location, any activity types, user information, whether the item is on a event planning system vendor list, recommendations from saved contacts, and purchases/clicks by saved contacts.

In an embodiment for lodging, the quick adds can be specific hotels/condos/houses. The suggested lodging can be associated with the type of event, the event date, the event location, any activities, user information, whether the lodging is on an event planning system vendor list, recommendations from saved contacts, and reservations/clicks by saved contacts.

In an embodiment for custom items, the quick adds can be types of custom items associated with the type of event, the event theme, the event date, the event location, user information, recommendations from saved contacts, purchases/clicks by saved contacts. The suggested custom items associated with the custom item type, the type of event, the event theme, the event date, the event location, the activity types, user information, whether the item is on our vendor list, recommendations from saved contacts, and purchases/clicks by saved contacts.

Figure 9:
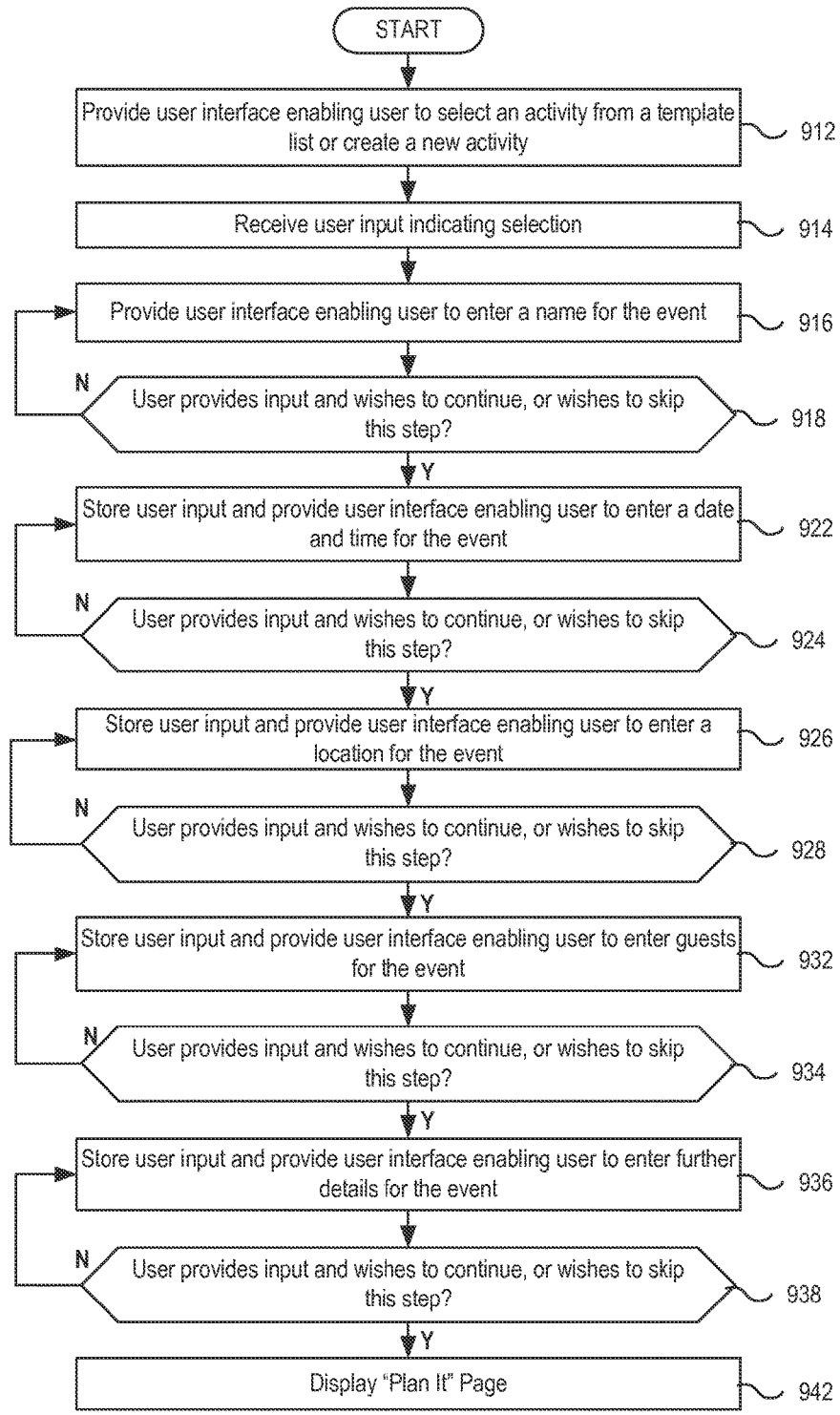
FIG. 9 is a flowchart illustrating a method of providing a GUI via the introductory planning Web pages of FIGS. 8A-8E.

FIG. 9 is a flowchart illustrating a method 900 of providing a GUI via the introductory planning Web pages of FIGS. 8A-8E. The method 900 begins at step 912 when it provides a GUI for introductory planning. In step 916, the method 900 provides a GUI for the user to enter a name for the event via a Web page such as naming introductory Web page 810 of FIG. 8A. The user may skip the step by proceeding to step 922 without entering information. However if the user has entered information and indicates that he or she wishes to continue, the method 900 stores the user input in the associated event record and provides another GUI for the user to enter a time for the event. In an embodiment, even if the user does not provide an input (for example, "skips the step"), the user may proceed to the next step, and supply the details anytime. In an embodiment, for the naming step, a placeholder and/or default name is recorded in the event planning database. Steps 916 and 918 are repeated for the introductory planning details of an event template. For example, step 922 enables a user to indicate when the event is taking place, step 926 enables a user to indicate where an event is taking place, step 932 enables a user to indicate potential invitees (i.e., participant users) to the event, and step 936 enables a user to indicate further details for the event that will appear in a planning summary of a "Plan It" Web page. When all steps are complete or skipped, a "Plan It" Web page is generated and displayed as a GUI to the user (such as the planning page 1010 of FIG. 10A). The "Plan It" Web page is a homepage for a particular event and may be accessed by the organizing user and participant users.

Figure 10A:
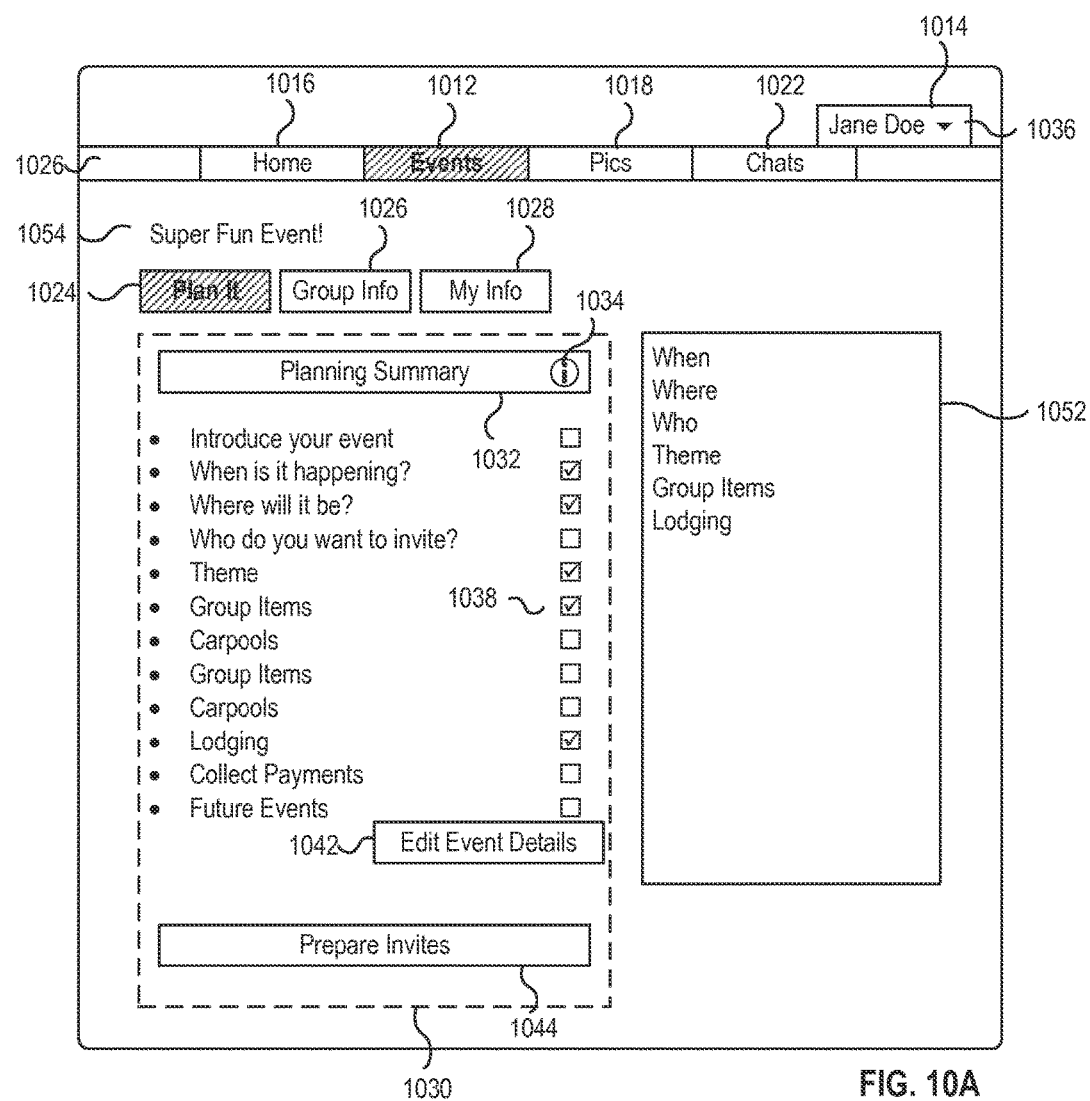
FIG. 10A shows an exemplary personal planning Web page for providing a GUI.
Figure 10B:
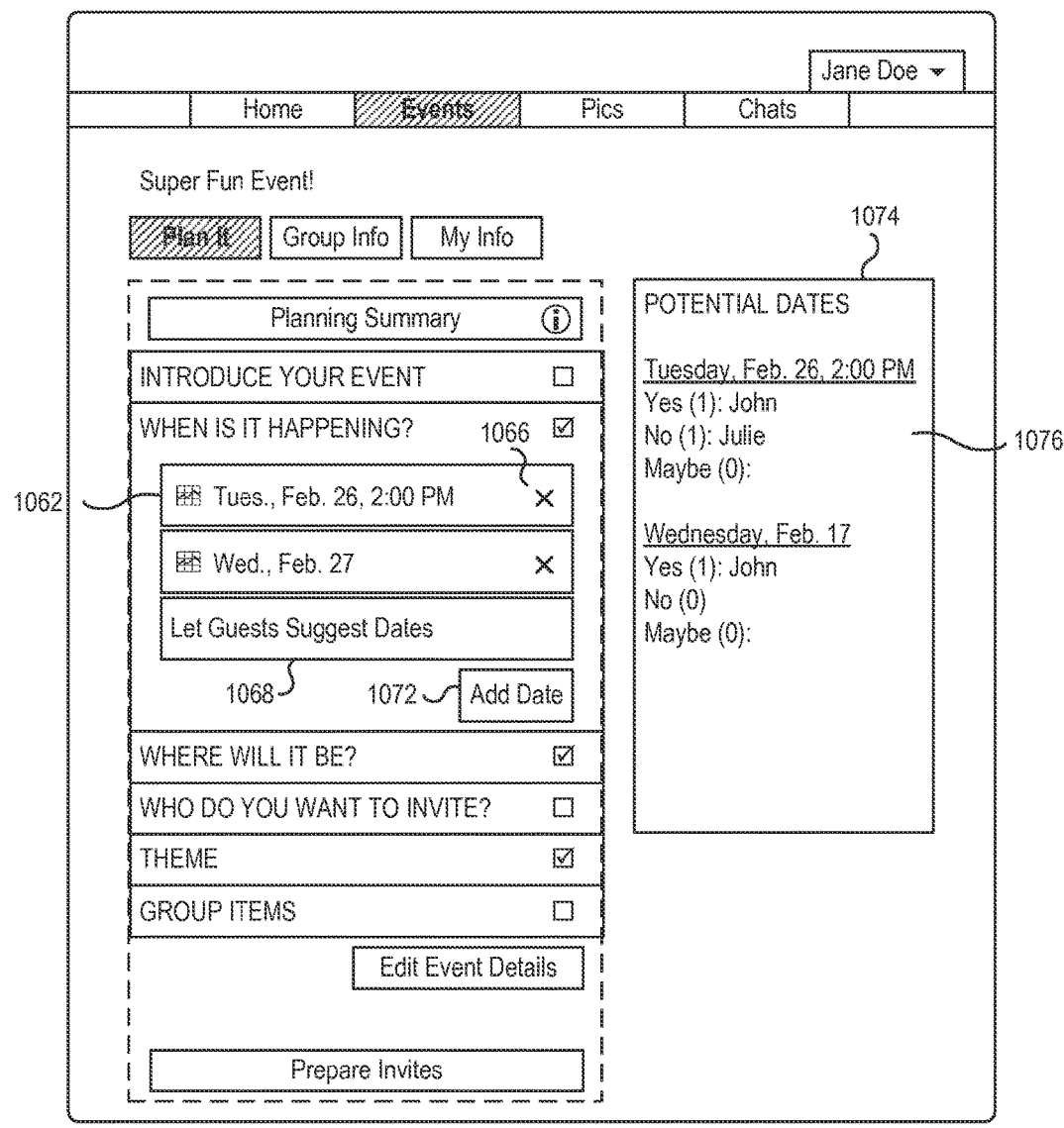
FIG. 10B shows an exemplary personal planning Web page for providing a GUI.

FIGS. 10A-10B are block diagrams of exemplary planning Web pages 1010 and 1050 for providing a GUI. FIG. 10A shows a collapsed view of the "Plan It" Web page. The "Plan It" Web page may include Buttons 1012, 1014, 1016, 1018, 1022, 1024, 1026, 1028, 1092, and 1044. These Buttons have the same functions as those described above for FIGS. 4 and 5, unless otherwise described herein. The planning Web page 1010 may display text and/or graphics 1054 indicating the name and type of event. In an embodiment, the planning Web page has a planning summary block 1030 for providing an area for users to edit aspects of the event. In another embodiment, the planning Web page 1010 has a display summary block 1052 that displays the recorded information within a particular category (that information is also referred to as "detail") of the event. The exemplary categories are shown as bullet points in the figure for simplicity, but in an embodiment are displayed as text boxes (such as in FIG. 10B) with text and links to activate corresponding functions enabling further editing of the details in each category. Each category may have a corresponding indicator 1038 showing progress towards completion of planning that aspect of the event. For example, in FIG. 10A, categories "When is it happening?", "Where will it be?", "Theme", "Group Items", and "Lodging" are complete and shown with a checked box, while the rest are not and are shown with an empty box. The display summary block 1052 may display information corresponding to a selected category based on the user's selection in the planning summary block 1030. For example, when "When is it happening?" is selected in the planning summary block 1030, the display summary block 1052 may show potential dates and a summary of the current polling results. Polling is discussed further below.

The Buttons 1024, 1026, and 1028 enable a user to activate a function to view and/or edit various aspects of an event as further described below. Buttons 1026, and 1028 will be displayed on the personal planning pages of participants. Buttons 1024 will additionally be displayed on the personal planning pages of hosts and co-hosts. When the user clicks the Button 1042, a function will be activated to enable the user to add or remove aspects of the event. When all information for generating invitations has been input, the Button 1044 is enabled, and the user will be able to click on it to activate a function to prepare invitations. In an embodiment, if invitations have already been sent, another button may appear below Button 1044 (not shown) for sending updates. Updates may also be sent to select participants. The information required for generating invitations may be predefined by the collaborative event planning system or the organizing user. Planning page 1010 is considered a "collapsed view," because each aspect of the event is listed as a heading consisting of one word or phrase within the planning accordion.

FIG. 10B shows an expanded view of the "Plan It" Web page. In planning page 1050, category "When is it happening?" 1062 is shown in an expanded form. Collapsed categories "Introduce your event", "Where will it be?", "Who do you want to invite?", "Theme", and "Group items" remain visible, but their details are hidden from view. A user may expand a category by clicking on the text corresponding to that category. In expanded form, the user can further edit that aspect of the event. For example, the GUI may display dates and/or times that were also proposed by participants of the event, in this case, Tues., February 26 at 2:00 PM and Wed., February 27. In an embodiment, additional details for each date are displayed in the display summary block 1074. For example, a polling feature may be enabled for each date and/or time to find the best time for all participants. The current results of the poll may be displayed under a heading for a particular time in display summary block 1074. The information displayed may include the number of responses corresponding to each answer "yes", "no", and "maybe". In another embodiment (shown), the names of participants who gave each response are displayed. For example, if one respondent indicated that Wednesday, February 17, works for him, the display summary would show "Yes (1): John" to represent the response category, number of responses for that category, and the user(s) providing those response(s). Various functions may be embedded into planning page 1050. For date and/or time planning, users may edit a polling feature by selecting a link, such as the graph icon to the left of the text in block 1062. Users may also remove a proposed date by selecting a corresponding link 1066. In another embodiment, if a participant adds a date, she or he may edit that date. Otherwise, only the host and co-hosts may edit and/or delete suggested dates. In an embodiment, only a single category is expanded at a time. In another embodiment, multiple categories may be expanded at a time.

FIG. 11 is a flowchart illustrating a method 1100 of providing a GUI via the planning Web pages of FIGS. 10A-10B. The method 1100 begins at step 1122 when a GUI is provided for the user to select an aspect of an event to view and/or edit. Upon receiving the user's selection in step 1114, the method 1100 provides a summary of the aspect (such as through display summary 1074 of FIG. 10B) and enables the user to edit the information associated with the selected aspect in step 1116. In an embodiment, a display of the category being edited is expanded to reveal more details and links that may be clicked to activate functions associated with that category. If the user provides input and indicates that he or she wishes to continue, for example, by clicking a "Done" button in step 1118, the method 1300 records the user input and if the category had been expanded, collapses the category. In an embodiment, the method 1100 updates the display to indicate the progress towards completion of that category. For example, if sufficient details, as predefined by the collaborative event planning system, have been entered, the display may show a checked box next to the category to indicate that it is complete. Completion may correspond to a decision having been made about an aspect of the event or simply that there is at least one proposal regarding that particular category. Different progress indicators are possible as well. Steps 1116 and 1118 may be repeated as many times as the user wishes for all categories, including those that have already been previously edited.

In step 1124, the method 1100 queries whether at least one guest has been added. In an alternative embodiment, the method 1100 queries whether all categories of the event are complete (not shown). As described above, in an embodiment, completion means consensus has been reached regarding a decision. In another embodiment, completion means that at least one proposal has been made for the category. If at least one guest has been added (or all aspects of the event are complete in an alternative embodiment), the method 1100 updates the display and enables a user to activate a link corresponding to a function for preparing invitations in step 1126. For example, the display may be updated by showing a "Prepare Invites" button in full color saturation (compared with a faded button before at least one guest has been added). If the user activates the function for preparing invitations in step 1128, the method 1100 displays an invitation that the user may choose to send to invitees. If the user approves the invitation in step 1134, then the method dispatches the invitations to the invitees in step 1136. As described above, the invitations may be sent by Email or by generating a URL link that the user may share with others. On the other hand, if the user does not wish to prepare invitations in step 1128, the method 1100 ends.

Figure 12:
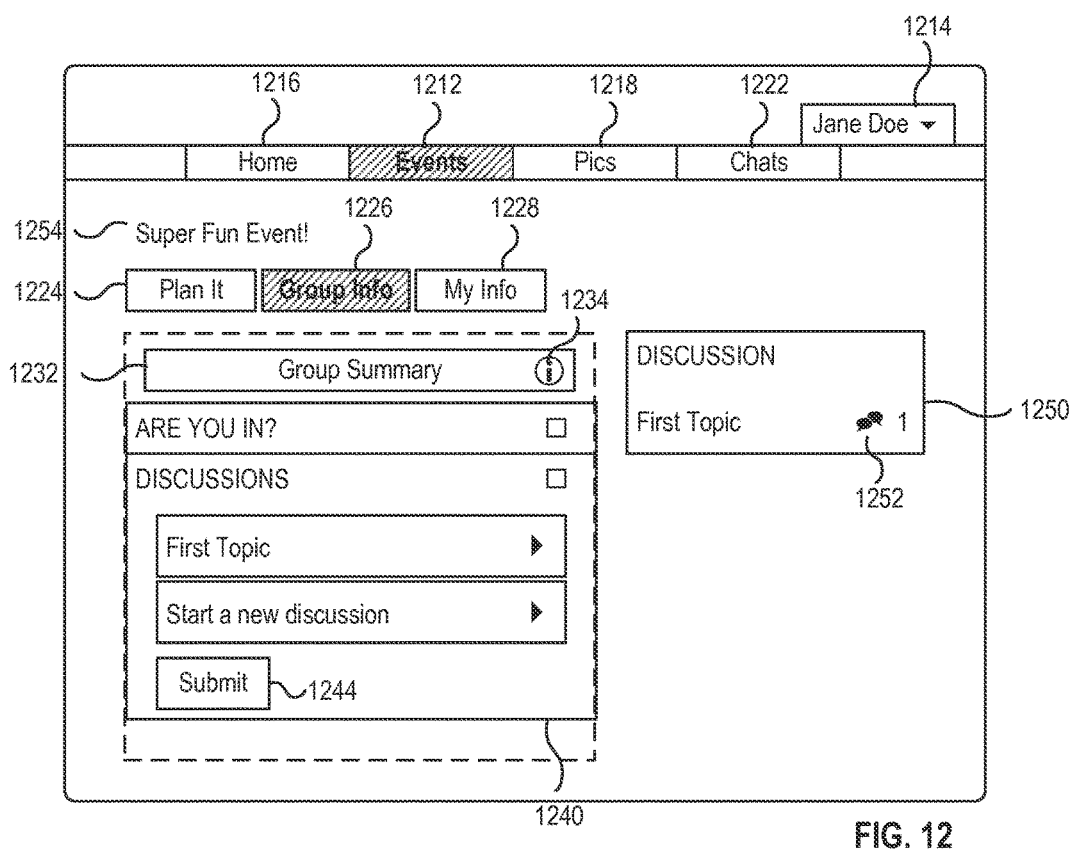
FIG. 12 shows an exemplary group information Web page for providing a GUI.

FIG. 12 shows an exemplary group information Web page 1200 for providing a GUI. The group information Web page 1200 displays information related coordinating group aspects of an event, such as polling participants for attendance and enabling discussions. The group information Web page 1200 functions similarly to the other Web pages described previously. It has Buttons 1212, 1214, 1216, 1218, 1222, 1224, 1226, 1228, and 1244. These Buttons have the same functions as those described above for FIGS. 4, 5, and 10, unless otherwise described herein. As shown, Buttons 1212 and 1226 are shaded in to indicate to user that they are currently viewing the "Group Info" aspect of "Events." A user may refresh a view of the page to display a top-level summary by clicking on Buttons 1226 and 1232. The categories in a group categories block 1240 may be expanded and collapsed in the same fashion as the planning summary block 1030 described above for FIGS. 10A and 10B. For example, a user may participate in a particular discussion by clicking a button corresponding to a discussion topic (here, "First Topic"), or start a new discussion by clicking "Start a New Discussion". When an arrow to the right of a button is clicked, a user who initiated the discussion can specify or edit the participants in the discussion. When a button corresponding to an existing or new discussion is clicked, a list of discussions for the event is displayed in a display summary block 1250. The arrow may indicate whether a block is expanded or collapsed, for example by rotating 90 degrees. The user may indicate in block 1240 which participants are in the discussion, and may post messages to the discussion in the group summary block 1250. In an embodiment, clicking button 1252 expands the list of discussion to show the comments and responses. Labels may also indicate the number of unread messages or the total number of messages in a discussion thread. The group summary block 1250 may include a summary of responses for all event details with links to more detailed information. Depending on the category selected in the group categories block 1240, corresponding activity details, group item chart, payment chart, lodging, etc. may be displayed.

Figure 13:
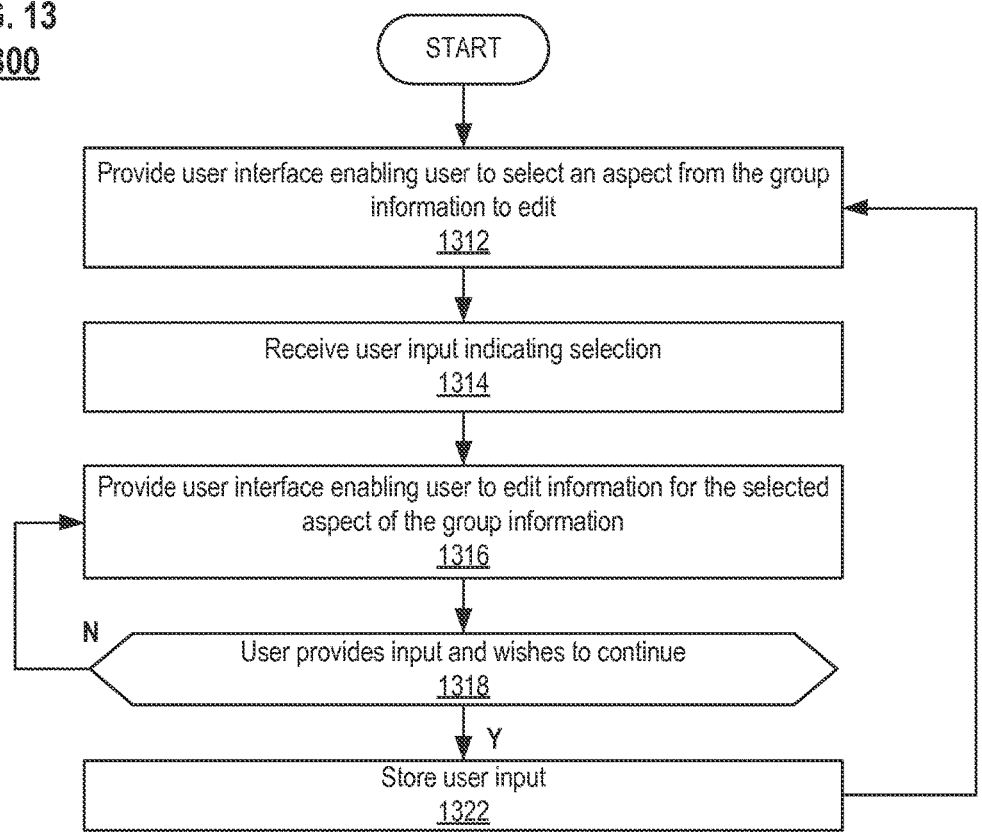
FIG. 13 is a flowchart illustrating a method of providing a GUI via the group information Web pages of FIG. 12.

FIG. 13 is a flowchart illustrating a method 1300 of providing a GUI via the group information Web pages of FIG. 12. The method 1300 begins at step 1312 by providing a GUI enabling a user to select an aspect of group information to view and/or edit. Upon receiving the user's selection in step 1314, the method 1300 provides a summary of the aspect and enables the user to edit the information associated with the selected aspect in step 1316. In an embodiment, a display of the category being edited is expanded to reveal more details and links that may be clicked to activate functions associated with that category. If the user provides input and indicates that he or she wishes to continue, for example, by clicking a "Submit" button in step 1318, the method 1300 records the user input and if the category had been expanded, collapses the category. In an embodiment, the method 1300 updates the display to indicate the progress towards completion of that category. For example, if sufficient details, as predefined by the collaborative event planning system, have been entered, the display may show a checked box next to the category to indicate that it is complete. Completion may correspond to a decision having been made about an aspect of the event or simply that there is at least one proposal regarding that particular category. Different progress indicators are possible as well. Steps 1316, 1318, and 1322 may be repeated as many times as the user wishes for all categories, including those that have already been previously edited.

Figure 14:
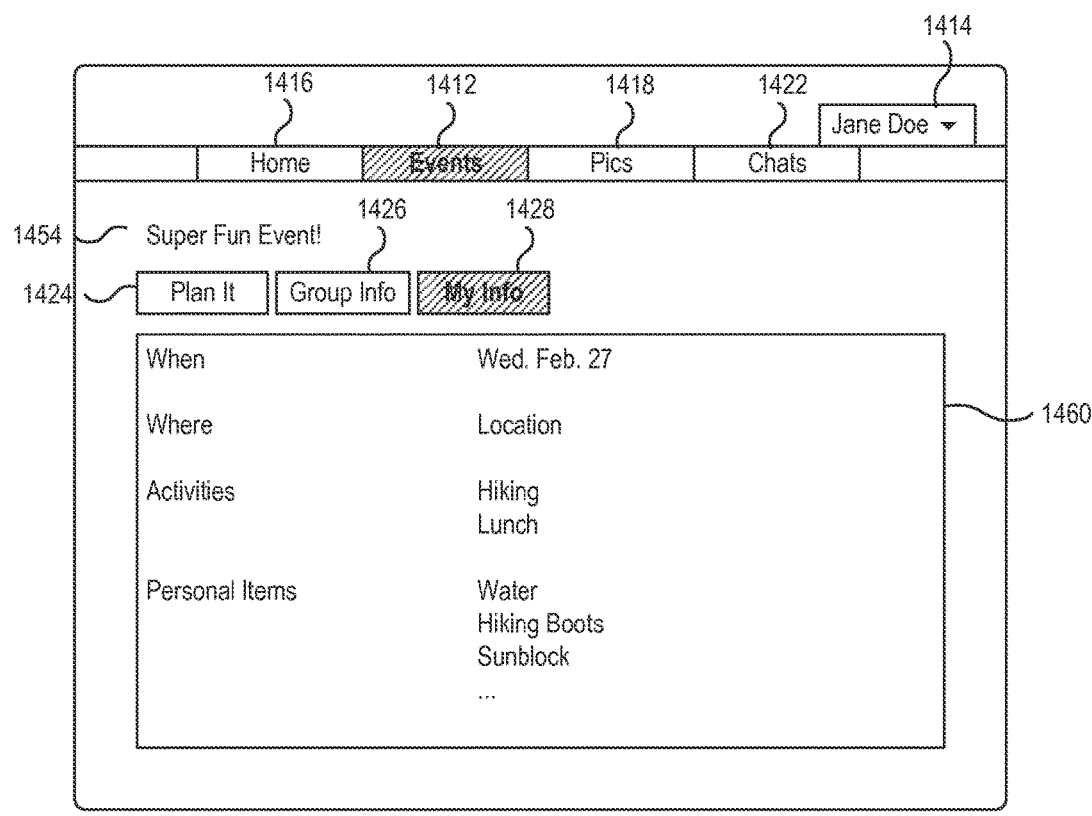
FIG. 14 shows an exemplary personal information Web page for displaying information related to a particular user account and event.

FIG. 14 shows an exemplary personal event information Web page 1400 for displaying information related to a particular user account and event. A summary of event details may be displayed in section 1460. The event details may be specific for the particular user. For example, if the user signed up to bring a particular group item, the item and any description may be displayed in summary section 1460. In another embodiment, the user may edit the list of items and create a checklist unique to that user. This information may also be printed and/or e-mailed.

Figure 15:
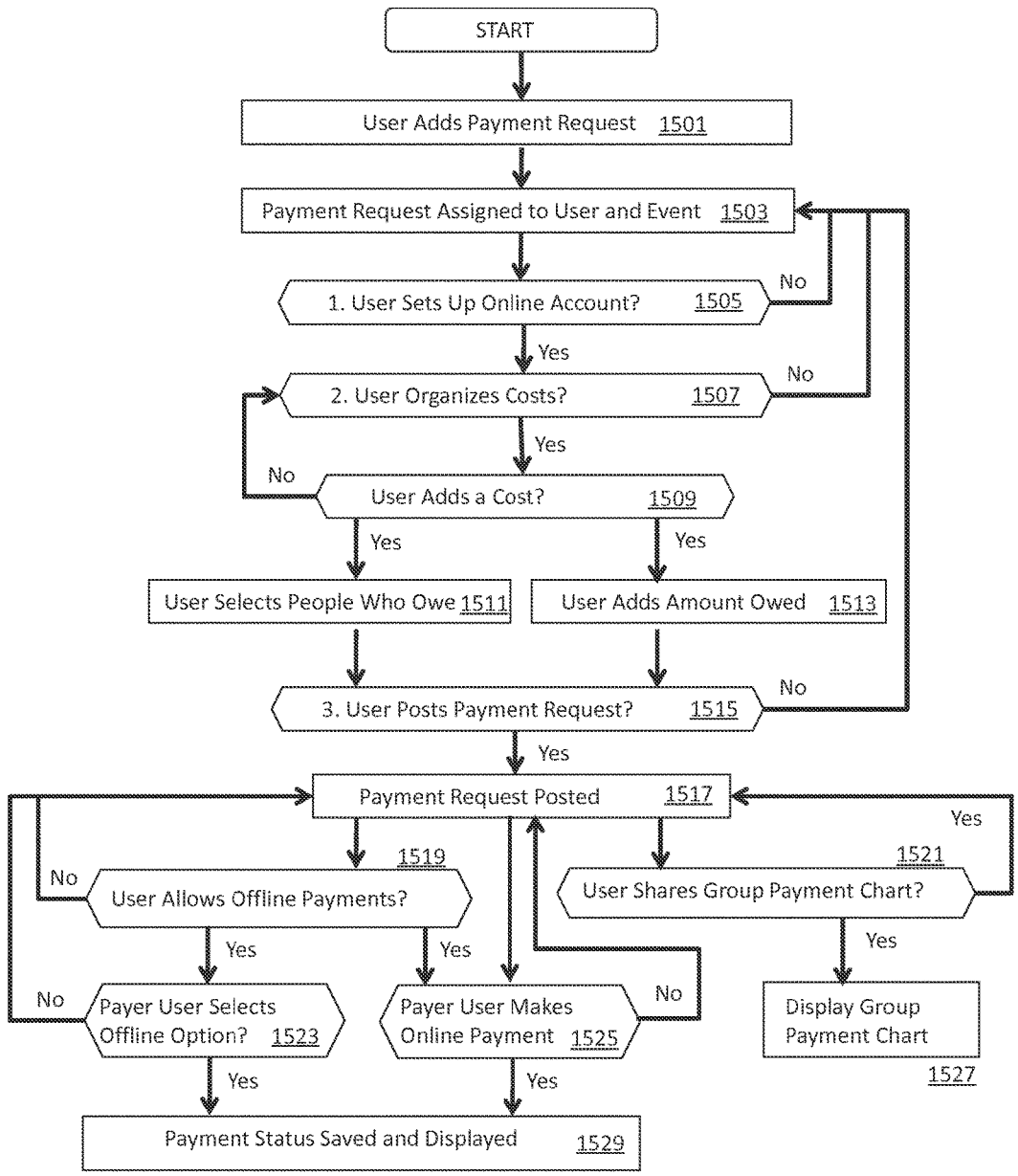
FIG. 15 is a flowchart illustrating a method for making a payment.

FIG. 15 is a flowchart illustrating a method 1500 for making a payment. Payment method 1500 may be activated by selecting a link from another page, for example "Collect Payments" of personal planning page 1010. In a first step 1501, a user may add a payment request for a particular cost associated with an event. The event planning system then assigns the payment request to the user making the request and the event in step 1503. The method 1500 then queries whether the user wishes to set up an online account in step 1505. If the user wishes to set up an online account, the user will be directed to a third-party payment processor system (such as the payment processor system 130 in FIG. 1). The method 1500 then queries whether the user wishes to organize costs in step 1507. Organizing costs may be itemizing costs or further dividing costs for the current cost category. For example, hotel rooms can be further organized by assigning payments for each bed in a room being shared. If the user wishes to organize costs, the method 1500 proceeds to step 1509 in which the user may add a cost. If the user adds a cost in step 1509, the user may select participants who owe that cost in step 1511 and/or specify the amounts owed in step 1513. Whether a participant owes for a cost may be determined by whether that participant has signed up for another aspect of the event, for example, an activity or lodging option. In another embodiment, one total cost may be entered and split among the participants who owe for that cost. The user may further specify whether participants can make offline payments, for example by mailing a check. In an embodiment, the event planning system provides a GUI for the user to provide information about where to send the offline payment and enables the user to track payments received online and mark offline payments as complete. The user may further specify when the payment is due. The user may further specify whether to display a group payment chart, for all participants of an event to see the breakdown of costs owed by each participant and which participants have made payments. The method 1500 then queries whether the user wishes to post the payment request to the participants selected in step 1511. If this is true, the payment request is posted in step 1517. In step 1519, the method 1500 determines whether the user allows offline payments, and in step 1521 whether the user wishes to share a group payment chart. If the user allows offline payments, the payer may elect to use an offline payment method in step 1523 and the selection is saved and displayed in step 1529. However, if the payer chooses to make an online payment instead, the payer may be directed to a third-party vendor to provide further payment details, and the status is saved and displayed by the event planning system in step 1529. The event planning system keeps track of payments on a non-recourse basis.

Polling is also possible for various event details. In an embodiment, a poll about a particular detail may be initiated by any user. Generally if a non-host participant is making a proposal, the proposal is displayed merely as a suggestion (also "potential"), and all users may be polled about the suggestion by default. If a host makes a proposal, it is displayed as a final detail by default. However, a host may enable polling about a final or potential detail. A host may also disable polling about a potential detail at any time. In the description below regarding polling, a host and co-host are treated as equivalents, and wherever "host" is mentioned, that also includes "co-hosts." Similarly, "non-host participants" are "non-host and non-co-host participants."

Figure 16:
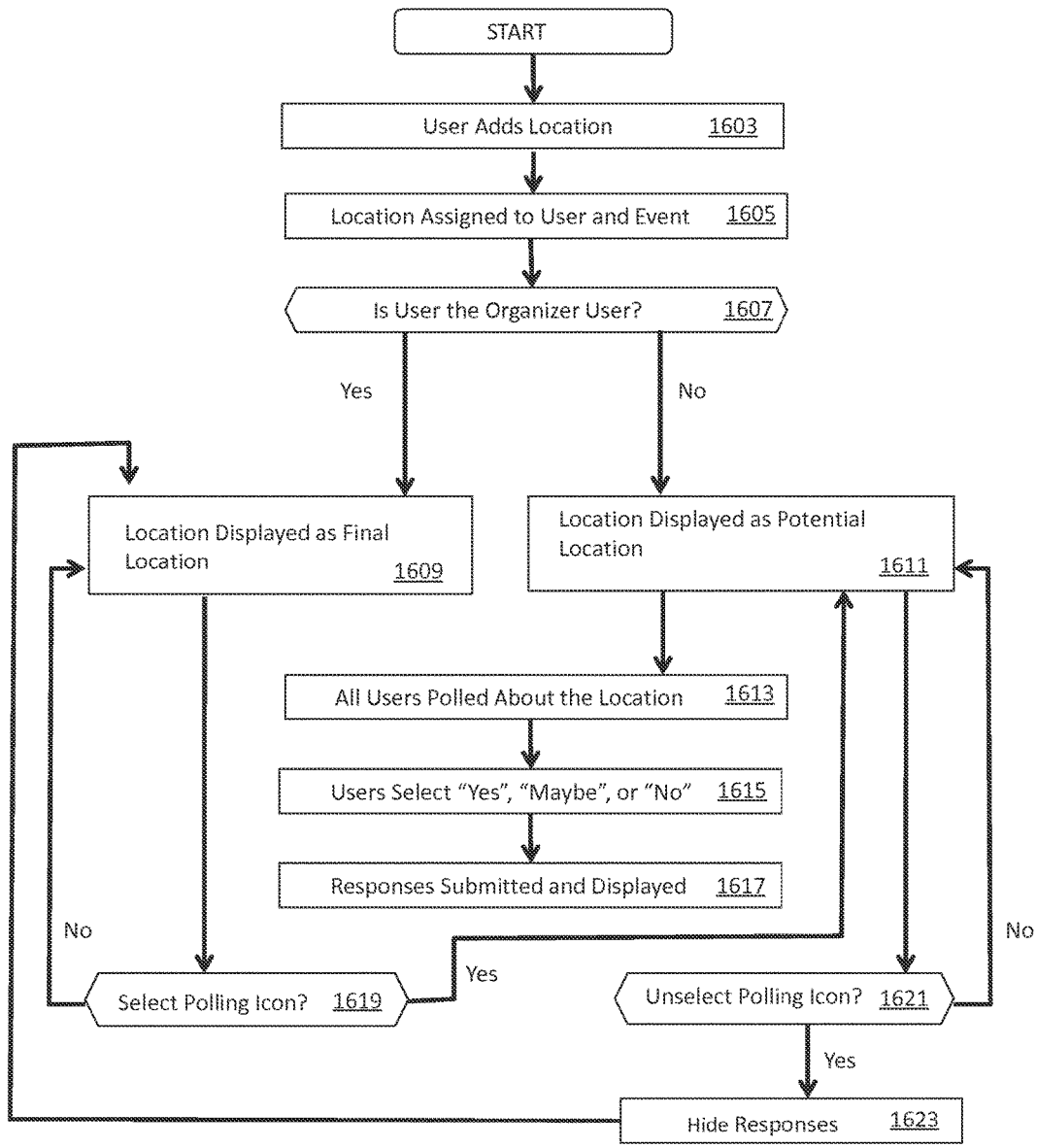
FIG. 16 is a flowchart illustrating a method for polling users about a location.

FIG. 16 is a flowchart illustrating a method 1600 for adding a location suggestion and/or polling users for a location. Location polling method 1600 may be activated by selecting a link from another page, for example "Where will it be?" of personal planning page 1010. In a first step 1603, a user may add a location poll about a particular cost associated with an event, which is then assigned to the user and the event for which the user is proposing the location in step 1605. In step 1607, the method 1600 queries whether the user is the host in step 1607. If the user is a host, the location is displayed as a final location in step 1609. In an embodiment, if the user is a co-host, the location may also be set as a final location in step 1609. However, if the user is not a host, then the location is displayed as a potential location in step 1611. The method 1600 then proceeds to step 1613, in which users are polled about the location. This may be performed whenever individual users log into their user accounts. For example, a user may receive a notification (further described below) requesting a response to a poll, and log in at any time to provide a response to the poll. When the user selects a response in step 1615, the response is submitted and displayed by the method 1600 in step 1617. The responses may be "yes", "maybe", and "no" as shown. The response may be stored as an entry in a corresponding table in the database. The entry may contain the response, the event ID, and a response ID that is unique to each response. The responses may also be identified by a symbol, such as "1" for "yes", "2" for "maybe", and "3" for "no" in the database. The event planning system may then compute totals for each response via a processor and display the summary of the responses in step 1617. A host or co-host may enable polling about a location, even if the location was previously finalized. In an embodiment, when a location is selected as final location in step 1609, the method 1600 may query whether a polling icon (such as the polling icon 1062 in FIG. 10B) has been selected by a user (host or co-host) in step 1619. A user selects a polling icon in step 1619 to request a response to the poll. If the polling icon is selected, the location is then displayed as a potential location in step 1611. A host or co-host may end voting on a location by unselecting a polling icon in step 1621. Once the polling icon is unselected in step 1621, responses are hidden in step

1623 and the location is displayed as a final location in step 1609. The responses may remain stored in the database. In embodiments, hosts may view responses even after the poll closes. In embodiments, an event location may be subject to polling and closed for polling multiple times.

Figure 17:
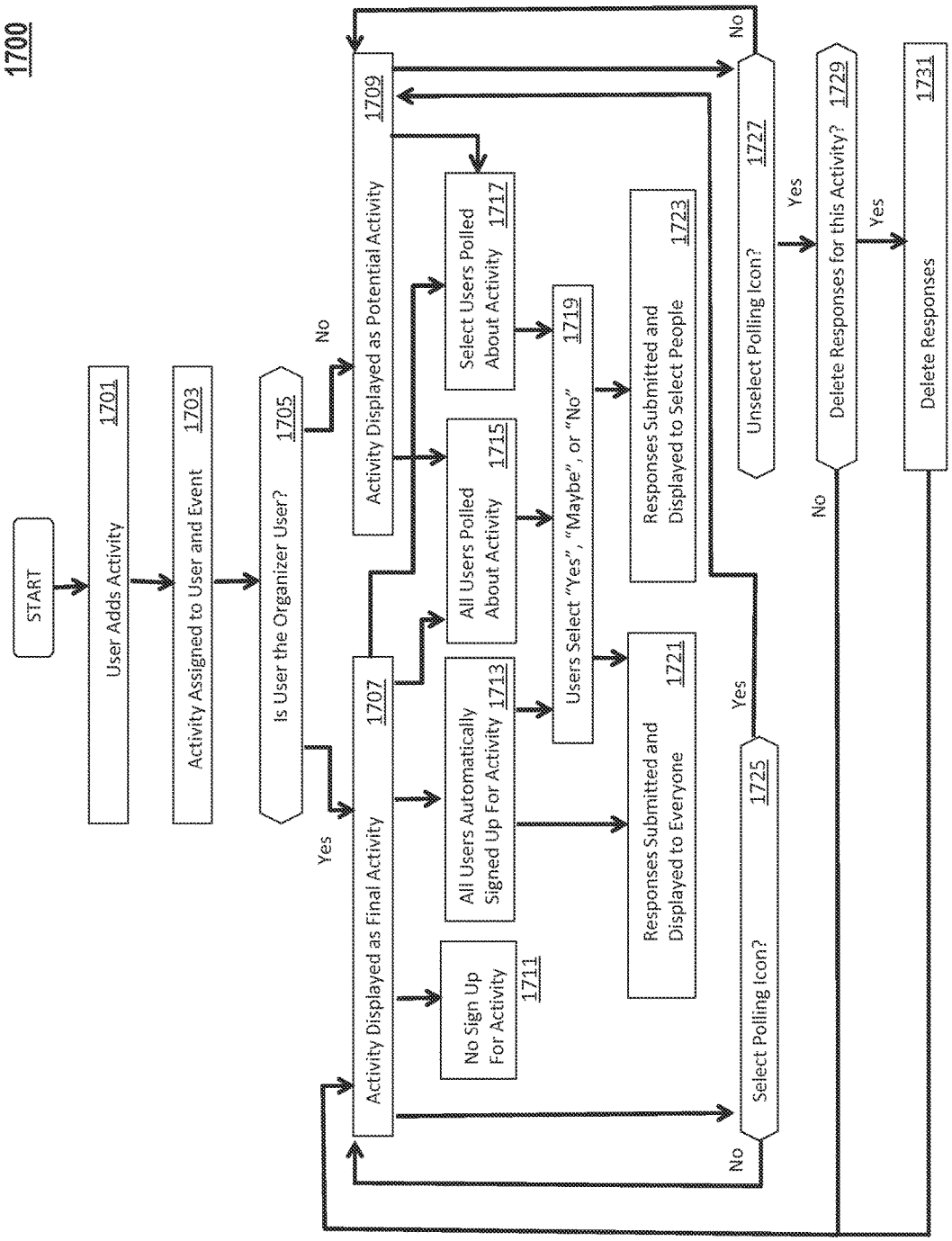
FIG. 17 is a flowchart illustrating a method for polling users about an activity.

FIG. 17 is a flowchart illustrating a method 1700 for polling users about an activity. The method 1700 is similar to the method 1600, and functions in essentially the same way unless described elsewhere herein. When a host inputs an activity in step 1701, it is displayed as a final activity by default in step 1707. The host may select whether signing-up is not applicable for the activity (box 1711), all participants are automatically signed up for the activity (box 1713), participants are polled about the activity (box 1717), or select participants are polled about the activity (box 1717). In an embodiment, the selected participants, which may be a subset of all participants, are recorded in the event planning database as a group to facilitate future editing and communications. The user who added the activity may choose to show the polling responses and activity details only to the select participants who have been polled about the activity. When a non-host user inputs an activity, the activity is displayed as a potential activity in step 1709, and all participants or select participants may be polled about the activity (boxes 1715 and 1717). In an embodiment, a non-host user may not select specific participants to be polled. Upon submission of responses, they may be displayed to everyone in step 1721 or displayed to select people in step 1723. To whom the responses are displayed, may be determined by the host or the user that suggested the activity. In embodiments, hosts also have an option to delete responses for a given activity in step 1729 after the conclusion of polling in step 1727.

Figure 18:
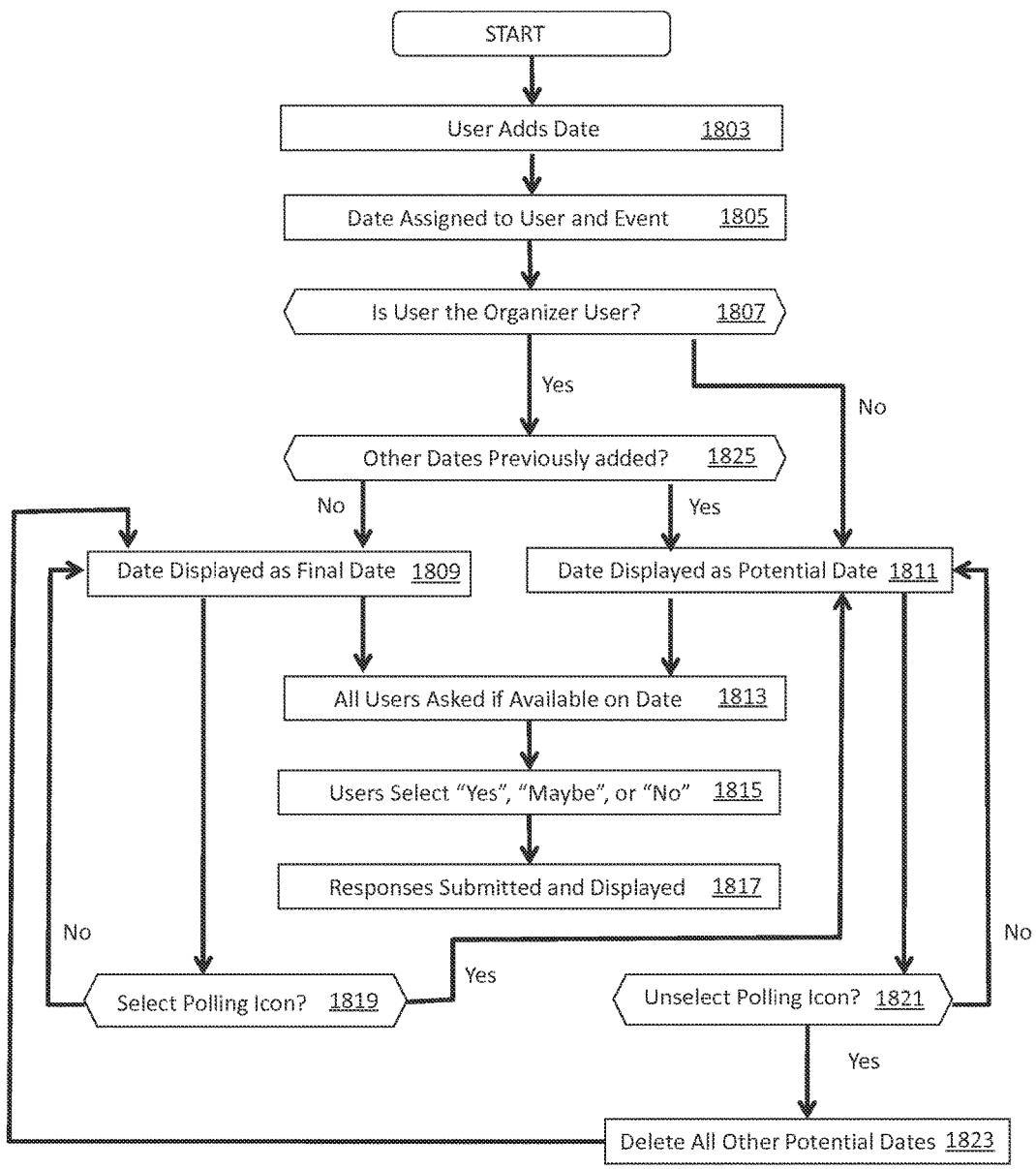
FIG. 18 is a flowchart illustrating a method for polling users about a date.

FIG. 18 is a flowchart illustrating a method 1800 for polling users about a date. The method 1800 is similar to the method 1600, and functions in essentially the same way unless described elsewhere herein. Prior to displaying a date input by the host as a final date (box 1809) or a potential date (box 1811), the method 1800 queries whether other date suggestions were previously added in step 1825. The first time a date is suggested, it becomes a final date. However, if other dates were previously added, the current date suggestion is displayed as a potential date. When a non-host user inputs a date, the date is displayed as a potential date (box 1811). Users are then polled about their availability for the current date in step 1813. Once polling ends in step 1821, all potential dates other than the current date are deleted in step 1823, and the current date is displayed as a final date in step 1809. In embodiments, the method 1800 may be repeated. For example, three potential dates may be narrowed down to a final date, but another user may suggest additional dates and open polling again to compare the final date and the new potential dates.

Figure 19:
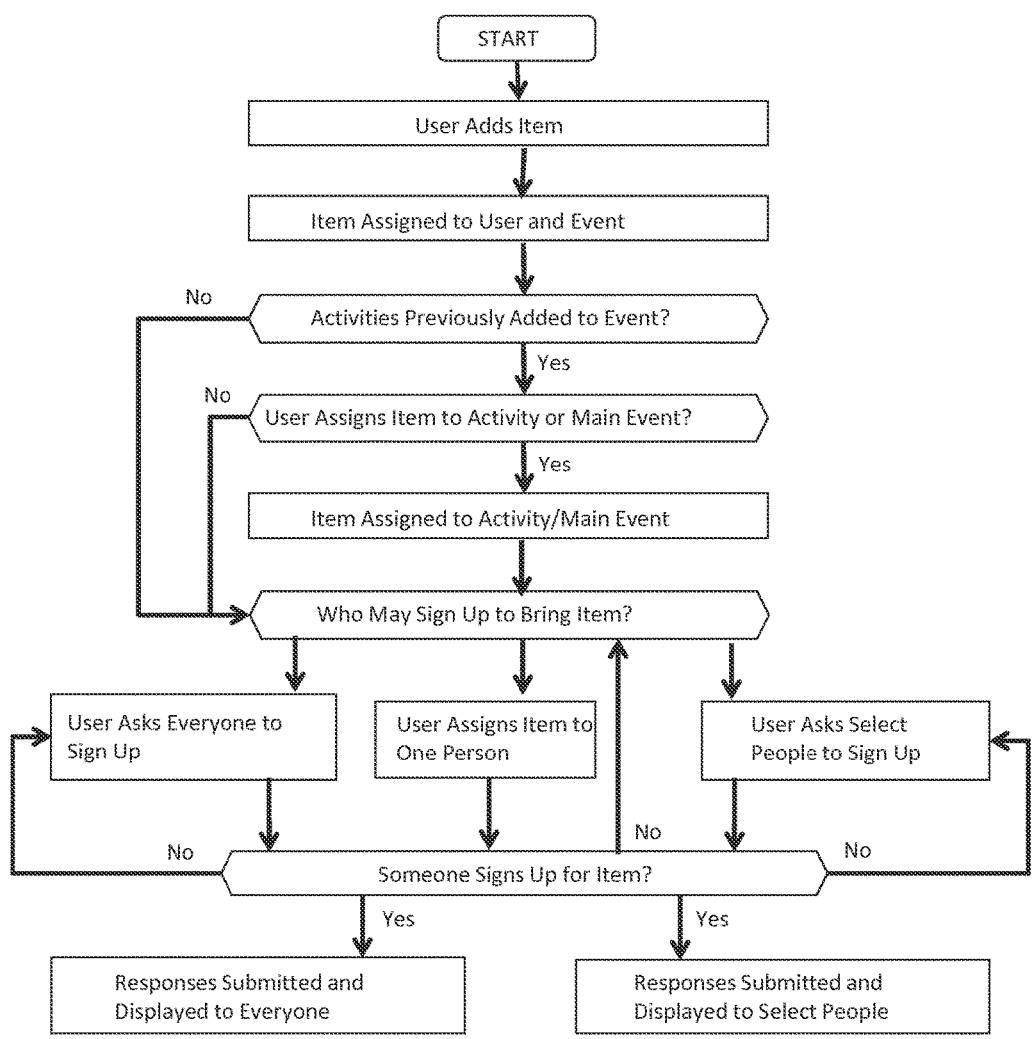
FIG. 19 is a flowchart illustrating a method for participants to sign up for group items.

FIG. 19 is a flowchart illustrating a method 1900 for polling users about an item. The method 1900 is similar to the method 1600, and functions in essentially the same way unless described elsewhere herein. In step 1905, the method 1900 queries whether event activities have been previously added to the event. If any event activities have been added, the user may assign an item to the main event or one of the event activities, and that information may be displayed on the group item chart. The method 1900 continues to step 1911 in which the user provides input corresponding to enabling everyone to sign up (box 1913), assigning an item to a single participant or a sub-group of participants to sign up (box 1917). "Signing up" can indicate that the user will bring the item to the event or be otherwise responsible for the item. For example, in a potluck, a user signs up to bring a dish. After someone signs up to bring the item in step 1919, that item is removed from the sign up list for all other users. The sign up responses may be displayed in the group item chart to everyone (box 1921) or only to select participants (box 1923) based on the user's preferences, as described above. In an alternative embodiment, the user may share details about the item for which the user has signed up. For example, if the user has signed up to bring a main course, the user may list the specific dish and the recipe for the dish.

Figure 20:
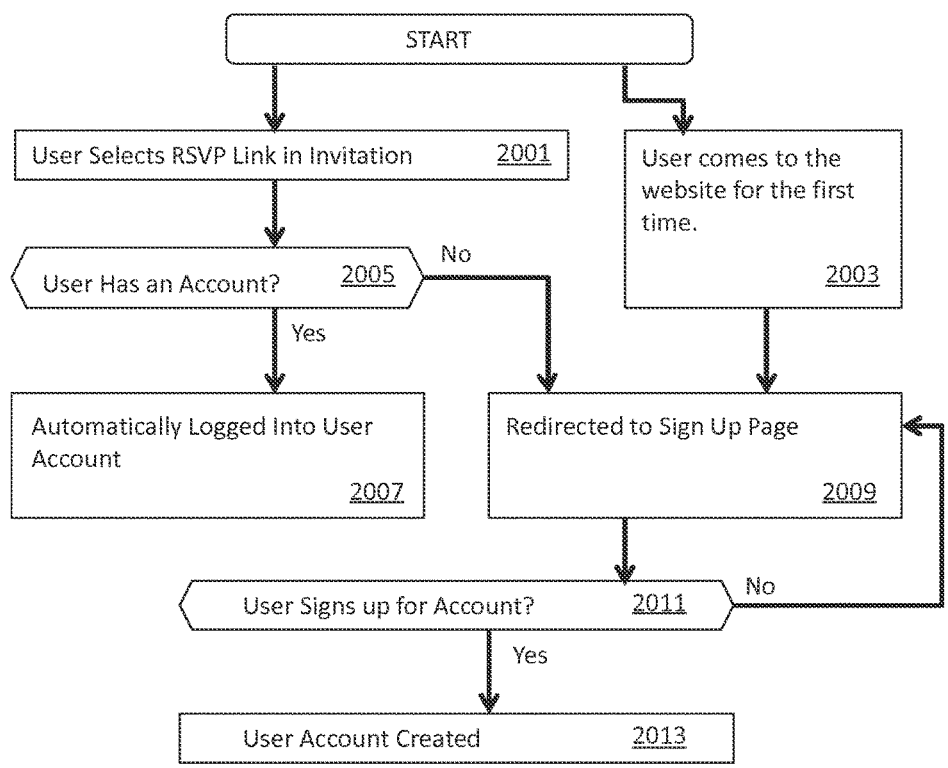
FIG. 20 is a flowchart illustrating a method for creating a user account.

FIG. 20 is a flowchart illustrating a method 2000 for creating a user account. In embodiments, a user can access the site directly via a Web browser (box 2003) or through selection of an RSVP link in an invitation (for example, dispatched as an Email) (box 2001). The user will then be redirected to a sign-up page in step 2009, unless the user selecting the RSVP link in the invitation has an account, in which case the user will be automatically logged into the account (box 2007) and may navigate the event planning system as described above. If a user signs up for an account in step 2011, a user account is created in step 2013 and a corresponding record is stored in the event planning database.

Figure 21:
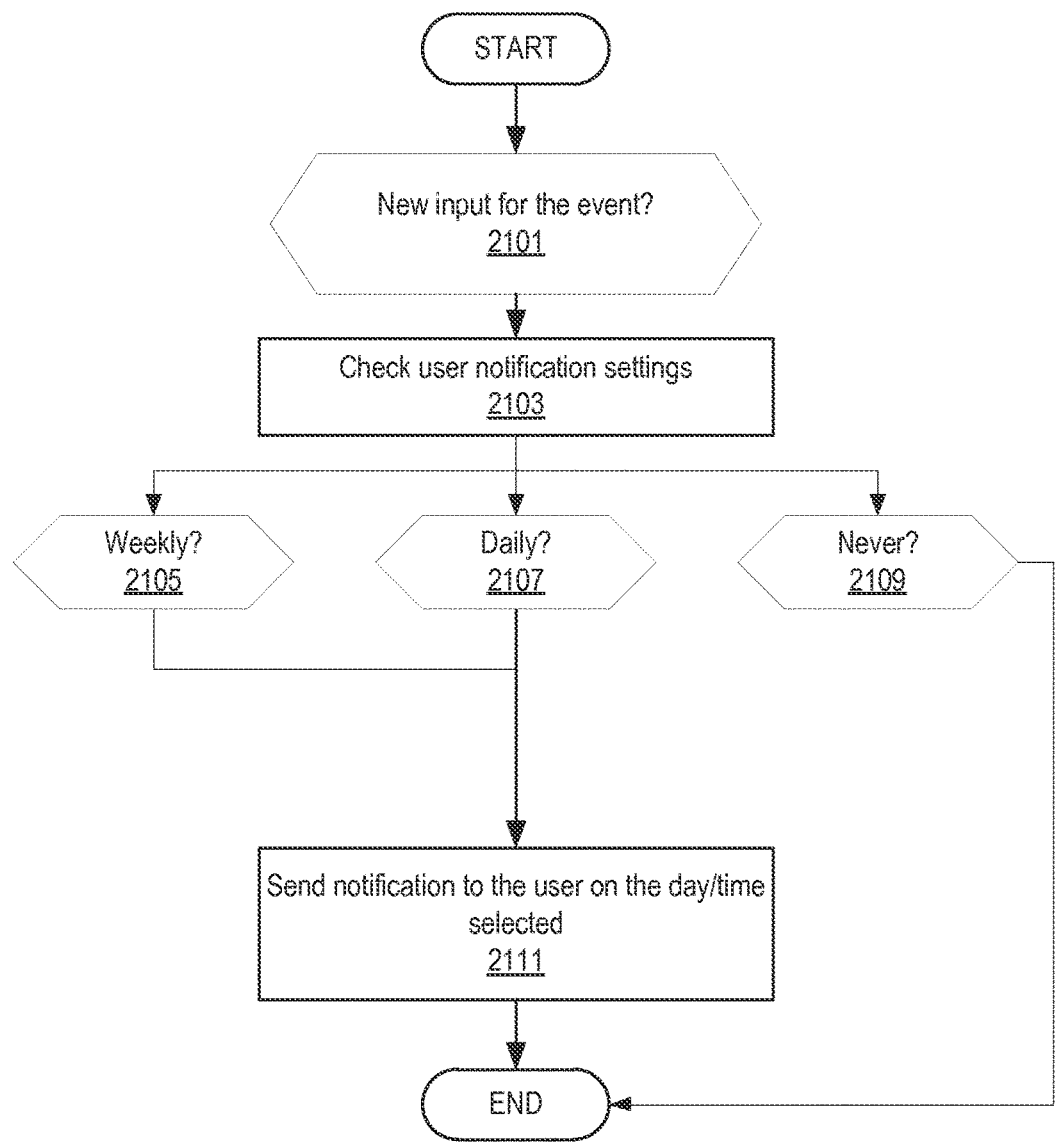
FIG. 21 is a flowchart illustrating a method for generating and sending notifications.

FIG. 21 is a flowchart illustrating a method 2100 for generating and sending notifications. The method 2100 may be performed for each user and for each of the user's event. For example, the method 2100 may be performed on every event that the user belongs to. In a first step 2101, the method 2100 determines that there is new input for an event in step 1801. An input can be considered "new" based on a preset time period: if an input is recorded on the event database during the time period (that was not there before the time period), the input is considered a "new input." In an embodiment, the event planning system checks for new inputs every thirty minutes. Types of input may be updates, responses, and suggestions. Responsive to detection of new input, the event planning system may send a notification to a user. The type of notification provided may vary based on the type of input and/or the user's preferences. If new input is detected for an event participant, the method 2100 then checks the user's notification settings in step 2103. Based on the preferences, which may be weekly (box 2105), daily (box 2107), monthly (not shown), never (box 2109), and other possibilities, the method 2100 may dispatch a notification. As described above, notifications may be by Email, displaying on the GUI of a personal page, planning page and/or a profile page. In an embodiment, if the event planning system detects a conflict based on the user's calendar, a user may be notified about the conflict when being polled about a date. A user may also be notified of the conflict by the method previously described above in relation to notifications.

Users may make recommendations and receive recommendations using the event planning system. In embodiments, there are three types of recommendations: (1) participants may make recommendations for other participants in their event, (2) the event planning system may make recommendations to users, and (3) participants may make recommendations to other users via the event planning system. For example, the event planning system may include a database of predefined recommendations.

Recommendations may also be prioritized based on how many users have made that recommendation, and other factors described above. In one embodiment, recommendations are prioritized by recommendations from contacts and participation by contacts. In another embodiment, recommendations are prioritized by type of event, location, date, user information (such as age), theme, activity information (such as type or location), and/or they are on a vendor list.

Figure 22A:
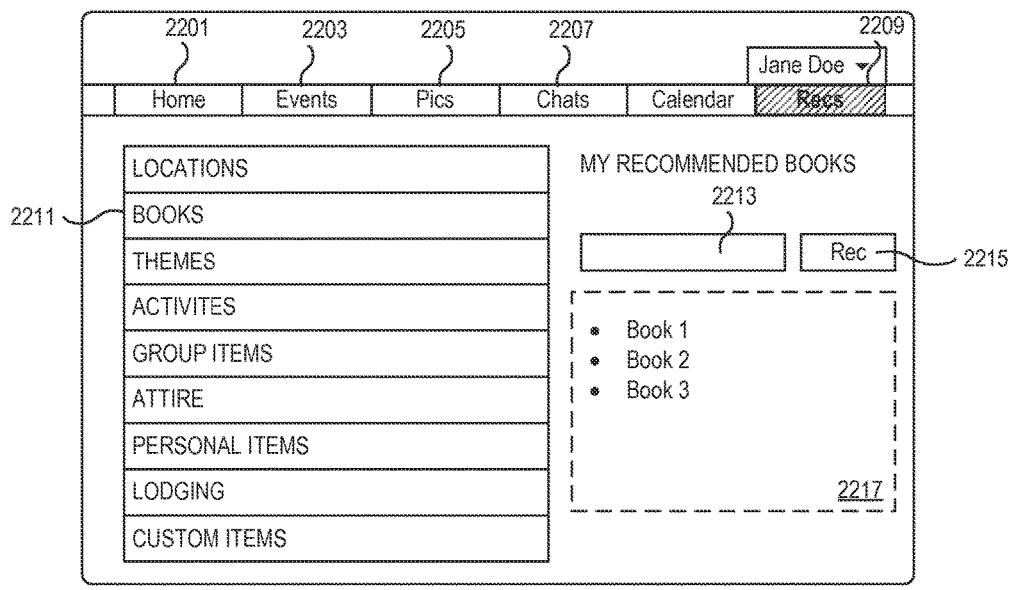
FIG. 22A shows a first view of an exemplary recommendations Web page for providing a GUI.
Figure 22B:
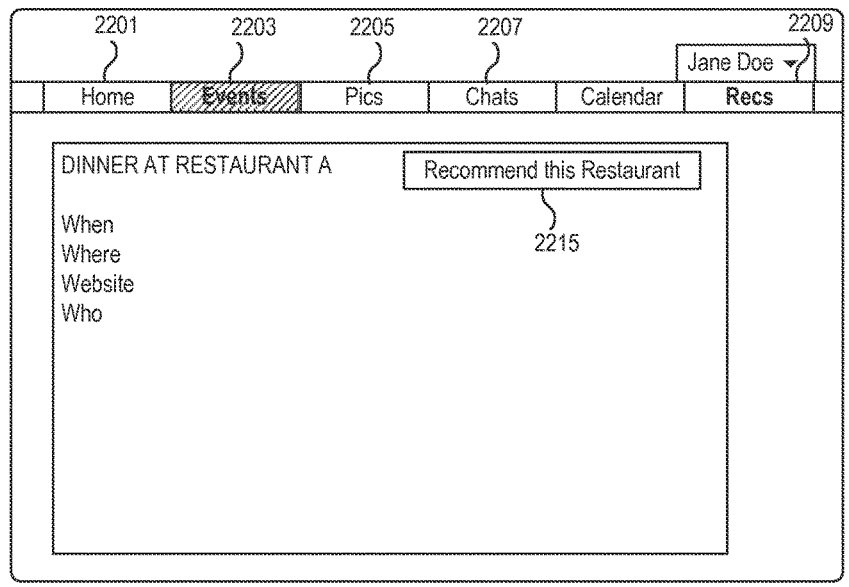
FIG. 22B shows another view of an exemplary recommendations Web page for providing a GUI.

One method for making a recommendation is through "Quick Adds" described above. "Quick Adds" may be suggested by the event planning system based on event details entered by users. In embodiments, both methods of making recommendations can be used in combination. FIGS. 22A and 22B show exemplary GUIs for making a recommendation by another method. A recommendation may be general and stored in the event planning database to be potentially used as a recommendation for any event. A recommendation may also be specifically made for a particular event.

FIG. 22A shows a first view 2210 of an exemplary recommendations Web page for providing a GUI to make general recommendations. The recommendations Web page may contain the same links and functions as the personal planning page 1010. In a first area, details of event are displayed, similar to the planning summary area 1030 of planning page 1010. Clicking on each detail may activate a link to display the user's recommendations related to that detail on a second area 2217 of the GUI. For example, "Books" is selected in view 2210. In area 2217, the user's recommended books are displayed. Recommendations may be easily added by searching for books in box 2213 directly within the GUI. In embodiments, the search is conducted through a third-party vendor, and suggestions may be displayed based on the search. A search result may be displayed, and a user may then recommend a book via button 2215 to add the book to the recommendations list displayed in area 2217. One of ordinary skill in the art will appreciate that recommendations may be tailored for the particular category for which a user is making a recommendation and may be associated with other event details.

FIG. 22B shows another view 2250 of an exemplary recommendations Web page for providing a GUI to make general recommendations. View 2250 illustrates that a user may make a general recommendation when viewing the event details of another event that she or he participated or is participating in. For example, the user participated in another event in which the user attended a dinner, and view 2250 shows the details for that dinner. The user may click on "Recommend This Restaurant" to recommend the restaurant, and the restaurant may be added to the user's Activities Recommendations for "Restaurant" or "Dinner" activity types (such as in FIG. 22A).

Figure 22C:
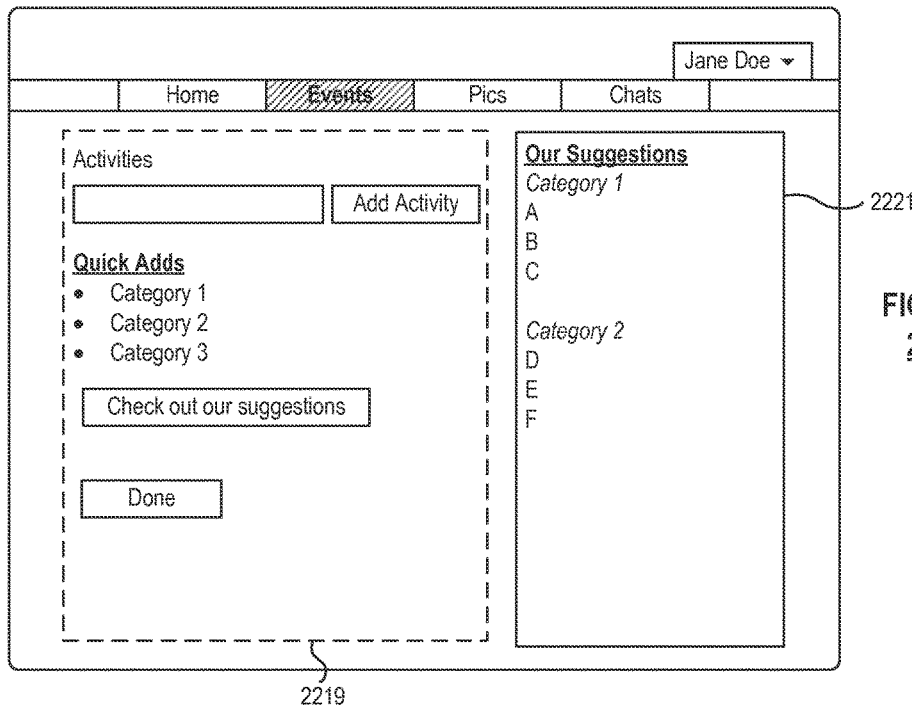
FIG. 22C shows another view of an exemplary recommendations Web page for providing a GUI.

FIG. 22C shows another view of 2270 an exemplary recommendations Web page for providing a GUI. In an embodiment, the view 2270 is associated with the planning pages (such as the pages in FIGS. 10A and 10B). In this view, a user has expanded a particular section in the planning summary area 2219 (here, "Activities"), but has not yet selected an activity. Quick Adds (as described above) may be displayed on the GUI as shown or as a drop-down menu. In another area, the event planning system may provide suggestions. In embodiments, the suggestions are linked to third-party vendors. Suggestions will be made according to the associations described above.

Figure 22D:
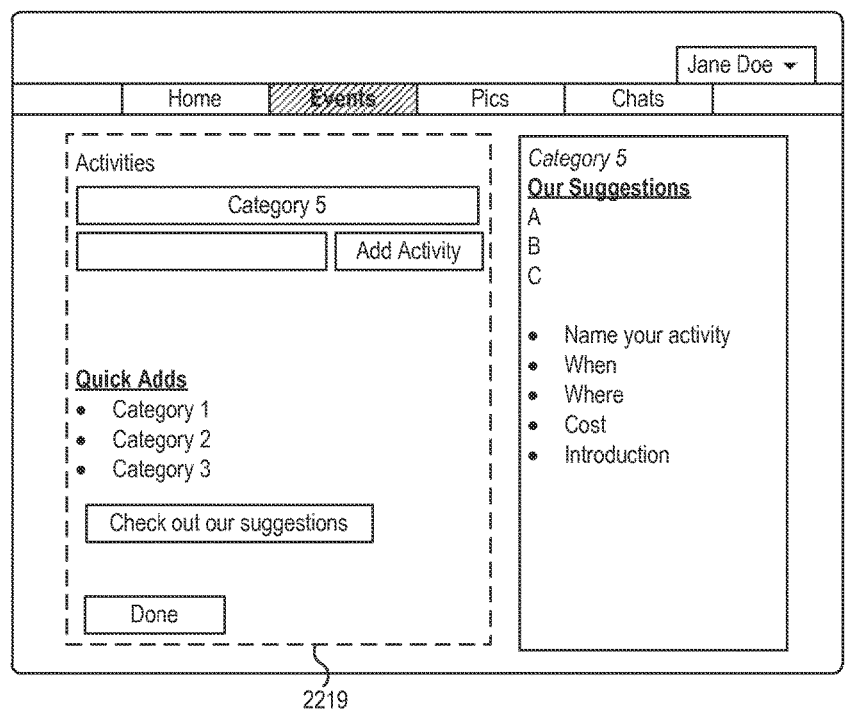
FIG. 22D shows another view of an exemplary recommendations Web page for providing a GUI.

FIG. 22D shows another view 2290 of an exemplary recommendations Web page for providing a GUI. The view 2290 shows that recommendations may also be displayed when a user has selected an activity type (here, Category 5) and is adding details for the activity. In embodiments, the suggestions are linked to third-party vendors.

Figure 23A:
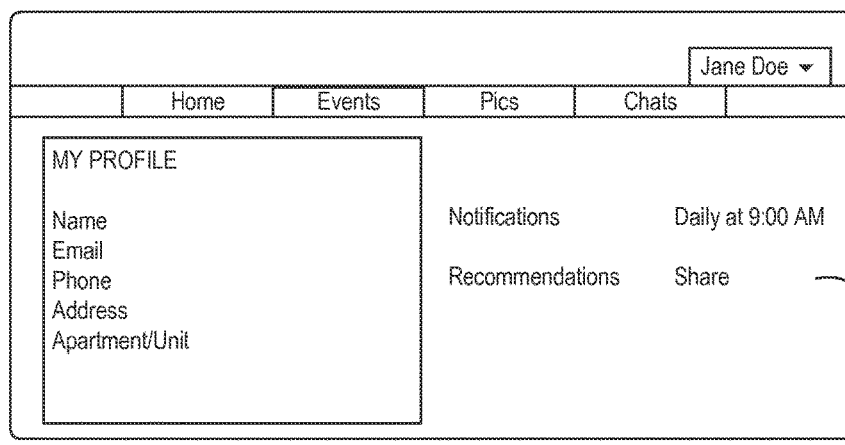
FIG. 23A shows a first view of an exemplary profile Web page for providing a GUI, and being used to edit recommendation settings.
Figure 23B:
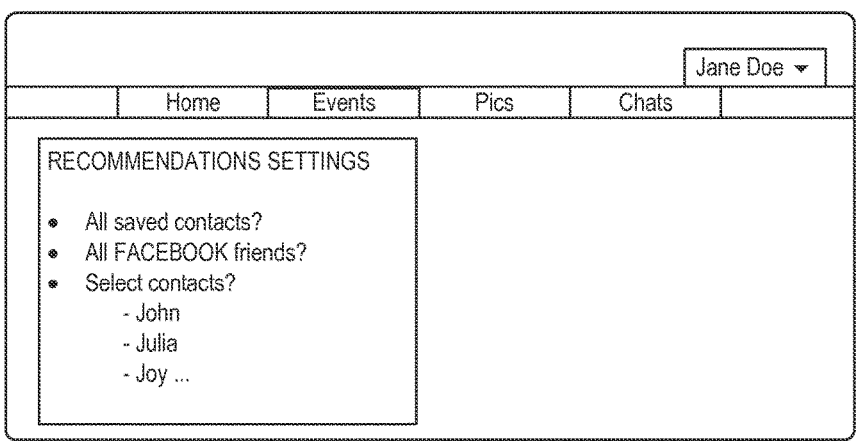
FIG. 23B shows another view of an exemplary profile Web page for providing a GUI, and being used to edit recommendation settings.

FIG. 23A shows a first view 2310 of an exemplary profile Web page being used to edit recommendation settings for providing a GUI. The profile Web page may have a section 2313 displaying privacy settings for making recommendations. Selection of an "Edit" link may activate a display on the GUI of recommendations privacy settings, an example of which is shown in view 2350. FIG. 23B shows another view 2350 of an exemplary profile Web page being used to edit recommendation settings for providing a GUI. This enables the visibility of recommendations made by a user for multiple events throughout the event planning system. In embodiments, visibility of recommendations may be limited to all saved contacts, all friends on a third-party platform such as FACEBOOK, and selected contacted from an address book within the event planning system.

Figure 24:
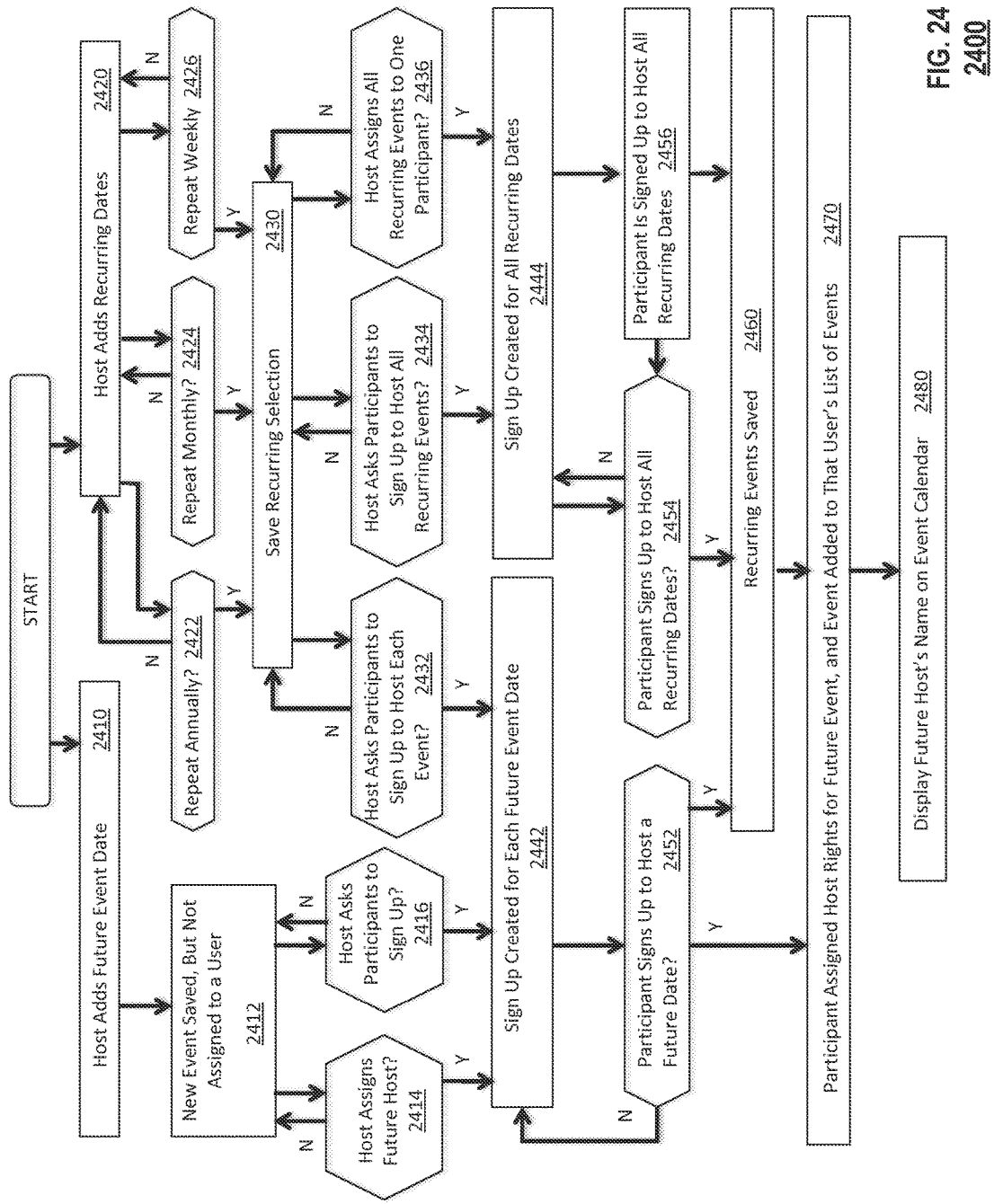
FIG. 24 is a flowchart illustrating a method for adding future event dates and organizing hosts for future events.

FIG. 24 is a flowchart illustrating a process 2400 for adding future event dates and organizing hosts for future events. The future events process 2400 may be activated by selecting a link from another page, for example in the "Future Events" aspect of personal planning page 1010. In the first steps 2410 and 2420, a host or co-host may add a future event date and/or recurring event dates. In an embodiment, the host may add as many future event dates and recurring event dates as he or she chooses. For example, a future event may be an event taking place subsequent to a first event in a series of events such as a lecture series in a given month. Events may also be recurring, such as a monthly book-club meeting.

If the host adds a future event date in step 2410, the new event may be saved, but not assigned to a user. In steps 2414 and 2416, the method 2400 queries who will be the future host. If the current host assigns a future host in step 2414, a sign up may be created for that future event date in step 2442 and the assigned participant may be automatically signed up. If the host asks participants to sign up in step 2416, a sign up may be created for that future event date in step 2442 and any participant may sign up. If a participant signs up to host a future event date in step 2452, the participant may be assigned host rights for the future event and the event may be added to that user's list of events. The future host's name may be displayed on the future events calendar in step 2480.

If the host adds recurring dates in step 2420, the method 2400 queries in steps 2422, 2424, and 2426 whether the event may repeat annually, monthly, or weekly. The host may select specific dates for the recurring events or allow the future host to select the event date. In step 2430, the recurring selection may be saved. In steps 2432, 2434, and 2436, the method 2400 queries who will be the future host(s). If the host asks participants to sign up to host future events in step 2432, a sign up may be created for each recurring event date in step 2442 and any participant may sign up. If the host asks participants to sign up to host all recurring events in step 2434, a sign up may be created for those recurring events in 2444 and any participant may sign up to host the recurring events. If the host assigns all recurring events to one participant, the assigned participant may be automatically signed up to host all recurring events in step 2456. If the participant signs up to host in steps 2452 or 2454, the recurring events may be saved. The participant may be assigned host rights for the recurring events in step 2470, and those events may be added to that user's list of events. The future host's name may be displayed on the event calendar in step 2480.

When future event dates are saved in steps 2412 or 2460, they may be saved with the same aspects as the aspects included in the first event. The future event date and the participants may be saved for all future events. In alternative embodiments, other details may be copied and saved for future events.

Each future host may select a time prior to the event to be reminded to start planning the future event. An email notification may be sent out at that time with a link to the event planning page.

A future event may be deleted by the original host at any time. The host of the future event may also delete, unselect the option to host the event, or edit the future event details at any time.

The descriptions and illustrations of the embodiments above should be read as exemplary and not limiting. Modifications, variations, and improvements are possible in light of the teachings above and the claims below, and are intended to be within the spirit and scope of the invention.

What is claimed is:

1. A method for receiving and transmitting, using a computer processor, synthesized information on a graphical user interface (GUI) that enables participants to collaborate about an event, comprising:
   receiving input from the host to display at least one category of the event;
   receiving input from the host to add participant(s) to the event;
   enabling participants to access varying levels of event information;
   receiving further input from a host, co-host, or invitee to add participant(s) to the event;
   collecting further input from a host, co-host, or invitee to display or hide a category or categories of the event;
   collecting input from a participant for detail(s) of the event;
   displaying event categories and potential and final event details to participant(s) in accordance with access levels;
   receiving a recommendation input from a user associated with a category or detail;
   receiving further input from the user to publicly transmit or limit transmission of the recommendation to other users;
   transmitting a recommendation to a participant for an event detail; and
   enabling the host, co-host(s), and invitee(s) to edit event details.

2. The method according to claim 1, further comprising:
   receiving and storing input for a third-party vendor recommendation associated with an event detail; and
   responsive to input for a third-party vendor recommendation, displaying a link to a third-party vendor recommendation.

3. The method according to claim 1, further comprising:
   searching the computer server system for all recommendations associated with an event category or an event detail;
   displaying and prioritizing event detail recommendations to the user in accordance with other information stored in the collaborative event planning system;
   displaying and prioritizing event detail recommendations to the user from the user's contacts;
   displaying and prioritizing event detail recommendations to the user from other users of the collaborative event planning system; and
   displaying and prioritizing event detail recommendations to the user from third-party vendors.

4. A method for collaborating about an event on a GUI comprising:
   providing, using a computer processor, a graphical user interface (GUI) for collecting user input regarding the event for at least: a date, a time, a location, and at least one participant;
   receiving participant input to enable editing privileges of individual participants;
   responsive to participant input, enabling participants to contribute to the planning process in varying degrees;
   responsive to participant input, displaying categories for the event;
   responsive to participant input, displaying details associated with event categories; and
   transmitting a recommendation to a participant for a displayed event category or event detail.

5. A method for collaboration about event details within an event category by participants, comprising:
   receiving input from a participant about an event detail associated with an event category;
   receiving input from participant(s) about additional event detail(s) associated with the event category;
   receiving input from participant(s) designating event detail(s) to be final or potential detail(s);
   responsive to a participant's designation as a final event detail, displaying the detail as final in the event category on the GUI;
   receiving and displaying responses from participants regarding a final event detail;
   responsive to participant's designation as a potential detail, displaying the detail as potential in the event category on the GUI;
   receiving and displaying responses from participants regarding a potential event detail;
   responsive to a participant changing the designation of a potential detail to a final detail, displaying the detail as final on the GUI;
   responsive to a participant changing the designation of a final detail to a potential detail, displaying the detail as potential on the GUI;
   receiving a recommendation input from a user associated with a category or detail;
   receiving further input from the user to publicly transmit or limit transmission of the recommendation to other users; and
   transmitting a recommendation to a participant for an event detail.

6. The method according to claim 5, further comprising, responsive to changing the designation of a potential detail to a final detail, hiding the input for other potential details.

7. The method according to claim 5, further comprising:
   receiving input from a participant designating which participants may sign up for a event detail;
   responsive to participant input, displaying a sign-up request for an event detail to all participants;
   responsive to participant input, displaying a sign-up request for an event detail to select participants;
   responsive to participant input, displaying all participants as signed up for an event detail; and
   responsive to participant input, hiding the sign-up request for an event detail.

8. A sign up is requested according to claim 7, further comprising:
   receiving input from a participant selecting a sign up response for a final detail;
   responsive to information detected by the collaborative event planning system, displaying a participant sign up response for a final detail; and responsive to a sign up response for a final event detail, updating the GUI for other event details associated with that response.

9. The method according to claim 5, wherein the potential detail is removable as a detail by a participant based on input from another participant and information detected by the collaborative event planning system.

10. The method according to claim 5, wherein the potential detail is automatically removed as a detail by the collaborative event planning system based on input from a participant and information detected by the collaborative event planning system.

11. A method for organizing a payment for an event detail comprising:

adding, via a GUI, a cost for an event detail;

selecting, via the GUI, at least one participant to contribute to the cost;

selecting, via the GUI, a set of participants associated with the-an event detail to contribute to the cost;

responsive to a sign up response for a final event detail, updating the set of participants associated with an event detail to contribute to the cost;

adding, via the GUI, an amount to contribute to the cost; dispatching, using a computer processor, notice of the payment to at least one participant;

responsive to a selection by the payee to enable offline payments and the payer making an offline payment, recording the offline payment via the GUI;

responsive to a selection by the payee, via the GUI, to display a group payment chart, displaying the group payment chart to at least one participant;

wherein the group payment chart tracks the progress of completion of the cost;

a participant setting up an account with a third-party vendor;

a participant collecting a payment from another participant via the third-party vendor; and updating, using the computer processor, the group payment chart to reflect completion of the payment.

* * * * *